United States Patent [19]

Murata et al.

[11] Patent Number: 5,750,893
[45] Date of Patent: May 12, 1998

[54] THERMALLY SENSING TYPE FLOWING VELOCITY MEASURING APPARATUS

[75] Inventors: Norihiko Murata, Yokohama; Tatsuo Miyachi, Tokyo, both of Japan

[73] Assignee: Ricoh Co., Ltd., Tokyo, Japan

[21] Appl. No.: 492,714

[22] Filed: Jun. 20, 1995

[30] Foreign Application Priority Data

Jun. 21, 1994 [JP] Japan ................................ 6-138816

[51] Int. Cl.$^6$ ................................................ G01F 1/68
[52] U.S. Cl. ................................................ 73/204.11
[58] Field of Search ...................... 73/204.11, 204.26, 73/204.19, 204.15

[56] References Cited

U.S. PATENT DOCUMENTS

| | | | |
|---|---|---|---|
| 5,050,429 | 9/1991 | Nishimoto et al. | 73/204.26 |
| 5,072,614 | 12/1991 | Hisanaga | 73/204.19 |
| 5,423,212 | 6/1995 | Manaka | 73/204.26 |

OTHER PUBLICATIONS

Heathkit/Zenith Educational Systems, Semi–conductor Devices, 160 & 161, Dec. 1983.

*Primary Examiner*—George M. Dombroske
*Assistant Examiner*—Jewel V. Artis
*Attorney, Agent, or Firm*—Oblon, Spivak, McClelland, Maier & Neustadt, P.C.

[57] ABSTRACT

Both of voltage range and supplied power range of a heater can be enlarged, one-sided power source for a driving circuit can be realized easily, power source voltage can be lowered, and flowing velocity can be measured with high accuracy.

First reference resistor is connected in series to fluid temperature measuring body, and second reference resistor is connected in series to heater temperature sensor. Temperature setting resistor for determining set temperature difference between the heater temperature sensor and the fluid temperature sensor is connected in series to the fluid temperature sensor. Bridge circuit is constructed in such way. The voltage of heater temperature sensor is inputted to non-inverted input terminal of differential amplifier, while the voltage of fluid temperature measuring body and temperature setting resistor is inputted to inverted input terminal of the same.

The output terminal of the differential amplifier is connected to a buffer circuit.

31 Claims, 17 Drawing Sheets

THERMALLY SENSING TYPE FLOWING VELOCITY MEASURING APPARATUS

BACKGROUND OF THE INVENTION

1. Field of the Invention

The present invention relates to a thermally sensing type flowing velocity measuring apparatus, in particular, a thermally sensing type flowing velocity measuring apparatus which comprises a heater, a temperature sensor for measuring the temperature of the heater, another temperature sensor for measuring the temperature of fluid, and a bridged structure, and measures the flow quantity (flow rate) and the flow velocity. For instance, the above measuring apparatus is the one applied to the flow velocity control for gas flow sensing meter, flow meter, air conditioner, and refrigerator (cooler), etc.

2. Description of the Background

As one of the prior-art documents describing the conventional flow rate sensor, for instance, there exists a published specification of Japanese Laid-open Patent Publication No. 56-18381/1981. In the specification, the flow rate sensor employs a basic substrate consisting of an upper layer portion which is thermally insulating and has an electrically-insulative property and a lower layer portion having a different electrically-insulative property. A part of the lower layer portion is removed and thereby a cavity is formed. A bridge is formed by use of the upper layer portion and a heater is disposed on the bridge. It is possible to dispose two heaters of small electric power consumption and small thermal time constant and of almost equal properties adjacent one another. Furthermore, since one end of the both heaters is respectively employed as common electrodes, the heater portion can be made small-sized and easily mounted on the bridge.

The published specification of Japanese Laid-open Patent Publication No. 61-274222/1986 describes that, in relation to the flowing of the insulative body, the temperature sensor for measuring the temperature of the fluid is provided at the end of the upstream side and the heater and the temperature sensor for measuring the temperature of the heater. In this construction, the flow velocity can be obtained from the electric power supplied to the heater which is necessary for making constant the difference between the temperature of the fluid and that of the heater.

Regarding the sensor called "a thermally sensing type flowing velocity sensor", there exist various sorts of sensors at present. The fundamental principle of its measurement is that the heater is installed in the fluid and the flowing velocity is measured from the thermal capacity (calorie) of the heater absorbed by the fluid. As one of the measuring methods mentioned in the specification of Japanese Laid-open Patent Publication No. 56-18381/1981, a part of the basic substrate is removed by use of the etching technology, and thereby a moat is formed. An electrically insulative film is bridged over the moat and a heating portion (heater) is mounted on the bridged film. Such construction has merits in that the thermal capacity of the heater is sufficient and the heat loss to the basic substrate turns out to be small.

As an example of such microbridge-type flowing velocity sensor, as shown in FIG. 30, there exists a flow sensor in which a moat 44 is formed on a semiconductor substrate, an insulative film is formed on the substrate so as to form a bridge structure 45 over the moat 44, and a heater 43 and a heater temperature sensor 42 are adjacently arranged. The respective resistors 41, 42, and 43 on the sensor are made of metal thin film (for instance, platinum thin film) and have a temperature coefficient of resistance.

As to the method of heating in the heater of the microbridge type flowing velocity, there exists a constant temperature heating methods which are classified in two types. The first type is a direct heating method of keeping constant the difference between the temperature of the heater 43 and that of the fluid temperature sensor 41. The second type is an indirect (side-)heating method of keeping constant the difference between the temperature of the heater temperature sensor 42 and the fluid temperature sensor 41. In the above-mentioned constant temperature heating method, since the greater the flowing velocity, the greater is the electric power supplied to the heater 43. Therefore the difference of the electric potential across the both ends of the heater 43 can be utilized as a flowing velocity signal.

As shown in FIG. 31, there exists a flowing velocity sensor in which a heater 43 is formed on the bridge 45 made of an insulative film, an upstream-side temperature sensor 42a and a downstream-side temperature sensor 42b are respectively disposed symmetrically at the upstream and downstream sides relative to the heater 43. The flowing velocity sensor outputs the difference of the temperature of the downstream-side temperature sensor 42b and that of the upstream-side temperature sensor 42a.

A representative example of the indirect (side-)heating circuit for driving a microbridge type flowing velocity sensor is shown in FIG. 32. Another representative example of the direct heating circuit for driving the sensor is shown in FIG. 33. In the respective circuits, a first reference (standard) resistor 51 and a second reference resistor 52 are arranged so as to compose opposing elements to each other in the bridge circuit. A temperature setting resistor 56 is connected in series with a fluid temperature sensor 53. An adjustment is done so as to get a balancing condition of the bridge circuit in a state of short-circuiting the temperature setting resistor 56. At the time of driving the sensor, the temperature setting resistor 56 is connected in the bridge circuit (its short-circuiting state is released) and the control operation is performed so as to raise the temperature of the heater temperature sensor 54 or that of the heater 55 to a certain constant value higher than the temperature of the fluid.

As mentioned heretofore, the microbridge type flowing velocity sensor is an element capable of measuring the flowing velocity with low power consumption and high sensitivity. In order to effectively utilize such characteristics as mentioned above, the sensor is intermittently driven with the driving circuits shown in FIG. 32 and FIG. 33. At the same time, there arises a tendency (movement) that the driving circuit is driven by the battery and the voltage of the power source is lowered. However, the input/output range of the signal voltage range of an operational amplifier employed in a differential amplifier 57 turns out to be narrower than the range of the voltage of the power source, and the dropping component of the input/output range from the voltage of the power source does not vary prominently even though the voltage of the power source is lowered. In the circuit as shown in FIG. 32 and FIG. 33, the output of the differential amplifier 57 is fed back. In particular, when the voltage of the power source is lowered, the voltage range of the heater 55 turns out to be considerably small. Those are demerits of the prior arts to be solved.

Furthermore, since the output of the operational amplifier is connected to the emitter follower and the base current flows therethrough, there arises a loss for the voltage to be applied to the heater 55 by the value of the voltage across the resistor 62 plus the voltage VBE between the base and emitter terminals of a transistor 63. In particular, in the case of adopting the directly-heating method as shown in FIG. 33, since the second reference resistor 52 is connected in series to the heater 55, the efficiency of utilizing the output voltage of the differential amplifier 57 is lowered. And further, when the driving circuit adopts a one-sided power source system, since the input/output range of the operational amplifier does not include a grounded potential, the voltage range of the heater 55 is considerably decreased. This is one of the demerits to be solved.

According to the result of the experiments performed by the inventors of the present invention, it has been made apparent that the greater both the setting value of the sensor's temperature and the square measure of the aforementioned bridge 45 are, the more accurately the flowing velocity can be measured. However, if both of the temperature setting value and the bridge square measure are increased, it follows that the voltage applied to the heater 55 must be increased. Namely, it is very difficult that the power source for the conventional driving circuits as shown in FIG. 32 and FIG. 33 is made one-sided and the voltage of the power source is lowered and further the flowing velocity is measured with high accuracy on the condition as mentioned above.

In consideration of such situation as mentioned heretofore, the present invention was made.

SUMMARY OF THE INVENTION

It is a primary object of the present invention to solve all of the problems mentioned heretofore.

It is another object of the present invention to provide a thermally sensing type flowing velocity measuring apparatus in which the voltage range of the heater and the range of the supplied electric power are enlarged.

It is still another object of the present invention to provide a thermally sensing type flowing velocity measuring apparatus in which the power source for the driving circuit can be easily one-sided.

It is still another object of the present invention to provide a thermally sensing type flowing velocity measuring apparatus capable of satisfying the measurement of the flowing velocity with high accuracy.

In order to solve the above-mentioned subject matters, the present invention is characterized by the matters mentioned hereinafter:

Item (1): The thermally sensing type flowing velocity measuring apparatus comprises:
  a moat formed by etching the substrate,
  a thermally sensing type flowing velocity sensor having a bridge suspended over the moat made of an electrically insulative film formed on the substrate and provided with a heater and a heater temperature measuring body mounted on the bridge and a fluid temperature measuring body mounted on a part of the electrically insulative film, indirectly (side-) heating means for keeping constant the difference between the temperature of the fluid temperature measuring body and the heater temperature measuring body, and
  a flowing velocity measuring circuit, wherein the flowing velocity measuring circuit comprises:
    a bridge circuit constructed with the fluid temperature measuring body, a first reference resistor connected in series thereto, the heater temperature measuring body, a second reference resistor connected in series thereto, and a temperature setting resistor for deciding the set difference between the temperature of the heater temperature measuring body and that of the fluid temperature measuring body,
    a differential amplifier connected in series to the bridge circuit, and
    a buffer circuit connected in series to the output terminal of the differential amplifier, and wherein the buffer circuit is constructed with an emitter-grounded amplifying circuit and a source follower.

Item (2): The thermally sensing type flowing velocity measuring apparatus comprises:
  a moat formed by etching the substrate,
  a thermally sensing type flowing velocity sensor having a bridge suspended over the moat made of an electrically insulative film formed on the substrate and provided with a heater and a heater temperature measuring body both mounted on the bridge and a fluid temperature measuring body mounted on a part of the electrically insulative film, and
  a flowing velocity measuring circuit driven by directly heating for keeping constant the difference between the temperature of the fluid temperature measuring body and the heater,
  wherein the flowing velocity measuring circuit comprises:
    a bridge circuit constructed with the fluid temperature measuring body, a first reference resistor connected in series thereto, the heater, a second reference resistor connected in series thereto, and a temperature setting resistor for deciding the set difference between the temperature of the heater temperature measuring body and that of the fluid temperature measuring body,
    a differential amplifier connected in series to the bridge circuit, and
    a buffer circuit connected in series to the output terminal of the differential amplifier,
  and wherein the buffer circuit is constructed with an emitter-grounded amplifying circuit and a source follower.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1, and FIGS. 3 through 8 show the embodiments of the indirectly heating type flowing velocity measuring apparatus according to the present invention respectively constructed with the circuit including emitter-grounded circuit and source follower.

FIG. 2, and FIGS. 9 through 14 show the embodiments of the directly heating type flowing velocity measuring apparatus according to the present invention respectively constructed with the circuit including emitter-grounded circuit and source follower.

FIG. 15, and FIGS. 17 through 22 show the embodiments of the indirectly heating type flowing velocity measuring apparatus according to the present invention respectively constructed with the circuit including source-grounded circuit and source follower.

FIG. 16, and FIGS. 23 through 28 show the embodiments of the directly heating type flowing velocity measuring apparatus according to the present invention respectively constructed with the circuit including source-grounded circuit and source follower.

DETAILED DESCRIPTION OF THE PREFERRED EMBODIMENTS

Figure 1:
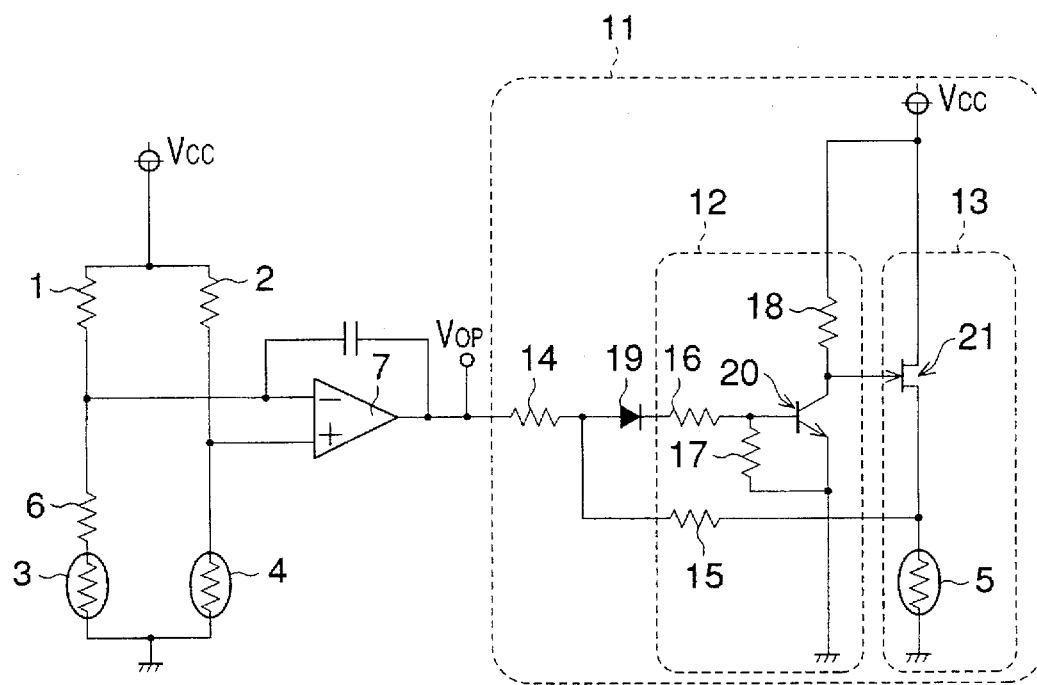
FIG. 1 is a circuit diagram showing an embodiment of a thermally sensing type flowing velocity measuring apparatus according to the present invention.

Item (3): In the afore-mentioned item (1) or (2), the buffer circuit is provided with an emitter-grounded circuit by use of a transistor at the drain terminal side of the source follower.

Item (4): In the item (3), the buffer circuit is constructed with the Darlington connection by further connecting a transistor to the preceding stage of the emitter-grounded circuit by use of the transistor.

Item (5): In the item (1) or (2), the buffer circuit further connects a transistor to the preceding stage of the emitter-grounded circuit by use of the transistor at the source terminal side of the source follower and thereby the same turns out to be constructed with the Darlington connection.

Item (6): In the item (5), the buffer circuit further connects a transistor to the preceding stage of the emitter-grounded circuit by use of the transistor and thereby the same is constructed with the Darlington connection.

Item (7): In the item (1) or (2), the buffer circuit is provided with a source-grounded circuit by use of a field effect transistor (FET) at the drain terminal side of the source follower.

Item (8): In the item (1) or (2), the buffer circuit is provided with a source-grounded circuit by use of a field effect transistor (FET) at the source terminal side of the source follower.

FUNCTIONS

The thermally sensing type flowing velocity measuring apparatus according to the present invention comprises: a moat formed by etching the substrate, a thermally sensing type flowing velocity sensor, indirectly (side-)heating means, measuring body and the heater temperature measuring body, and a flowing velocity measuring circuit, as mentioned heretofore.

(1) Since the flowing velocity measuring circuit comprises: a bridge circuit, a differential amplifier connected in series to the bridge circuit, and a buffer circuit connected in series to the output terminal of the differential amplifier, as mentioned above, and the buffer circuit is constructed with an emitter-grounded amplifying circuit and a source follower, it is easily realized to lower the voltage of the power source and make the power source in a state of one-sided and thereby it is possible to provide an indirectly (side-)heating type flowing velocity sensor driving circuit, as a result of employing an emitter-grounded amplifier and a source follower.

(2) Since the flowing velocity measuring circuit comprises: a bridge circuit, a differential amplifier connected in series to the bridge circuit, and a buffer circuit connected in series to the output terminal of the differential amplifier, as mentioned above, and the buffer circuit is constructed with an emitter-grounded amplifying circuit and a source follower, it is easily realized to lower the voltage of the power source and make the power source in a state of one-sided and thereby it is possible to provide a directly heating type flowing velocity sensor driving circuit capable of enlarging the range of the voltage applied to the bridge circuit, as a result of employing an emitter-grounded amplifier and a source follower.

(3) Since the buffer circuit is provided with an emitter-grounded circuit by use of a transistor at the drain terminal side of the source follower, it is easily realized to lower the voltage of the power source, and thereby it is possible to construct a buffer circuit, the output of which sharply drops to the ground electric potential, as a result of disposing the emitter-grounded circuit at the drain side of the source follower.

(4) Since the buffer circuit is constructed with the Darlington connection by further connecting a transistor to the preceding stage of the emitter-grounded circuit by use of the transistor, it is possible to shift the voltage and to obtain a high input resistance value and thereby to cause the voltage output to sharply drop to the ground electric potential, as a result of constructing the buffer circuit with the Darlington connection.

(5) Since, in the buffer circuit, an emitter-grounded circuit by use of the transistor is disposed at the source terminal side of the source follower and thereby the same turns out to be constructed with the Darlington connection, it is easily realized to lower the voltage of the power source, and thereby it is possible to construct a buffer circuit, the output of which sharply drops to the ground electric potential, as a result of disposing the emitter-grounded circuit at the source side of the source follower.

(6) Since the buffer circuit further connects a transistor to the preceding stage of the emitter-grounded circuit by use of the transistor and thereby the same is constructed with the Darlington connection, it is possible to shift the operational voltage of the emitter-grounded circuit and to obtain a high input resistance value and further to easily lower the power source voltage, and thereby it is possible to construct a flowing velocity sensor driving circuit the output of which sharply drops to the ground electric potential, as a result of constructing the buffer circuit with the Darlington connection.

(7) Since the buffer circuit is provided with a source-grounded circuit by use of a field effect transistor (FET) at the drain terminal side of the source follower, as a result, it is possible to attain a higher input resistance value and a lower consumed electric power compared with the emitter-grounded circuit described in the items (3) and (4), and thereby it is possible to construct a flowing velocity sensor driving circuit, the output of which sharply drops to the ground electric potential. ( 8) Since the buffer circuit is provided with a source-grounded circuit by use of a field effect transistor (FET) at the source terminal side of the source follower, as a result, it is possible to attain reduction of the number of parts, a higher input resistance value and a lower consumed electric power compared with the emitter-grounded circuit described in the items (3) and (4), and thereby it is possible to construct a flowing velocity sensor driving circuit, the output of which sharply drops to the ground electric potential.

EMBODIMENTS

Embodiments according to the present invention are described hereinafter, referring to the accompanying drawings.

At first, the first status of the embodiment is explained.

FIG. 1 is a construction diagram (circuit diagram) for explaining an embodiment of the thermally sensing type flowing velocity measuring apparatus according to the present invention. FIG. 1 shows the case of employing an indirectly heating type flowing velocity sensor. In FIG. 1, the reference numeral 1 represents a first reference resistor, 2 a second reference resistor, 3 a fluid temperature sensor, 4 a heater temperature sensor, 5 a heater, 6 a temperature setting resistor, 7 a differential amplifier, 11 a buffer circuit, 12 an emitter-grounded amplifying circuit, 13 a source follower, 14–18 resistors, 19 a diode, 20 an NPN transistor, and 21 a junction type FET (Field Effect Transistor).

In the indirectly heating type driving circuit, the first reference resistor 1 is connected in series to the fluid temperature sensor 3, and the second reference resistor 2 is connected in series to the heater temperature sensor 4. And further, the temperature setting resistor 6 for determining the set difference between the temperature of the heater temperature sensor 4 and that of the fluid temperature sensor 3 is connected in series to the fluid temperature sensor 3. The bridge circuit is constructed in such way as mentioned above. The differential amplifier 7 receives the voltage of the heater temperature sensor 4 as a non-inverted input and receives the voltages of the fluid temperature sensor 3 and the temperature setting resistor 6 as the inverted inputs. The output terminal of the differential amplifier 7 is connected to the buffer circuit 11.

Figure 12:
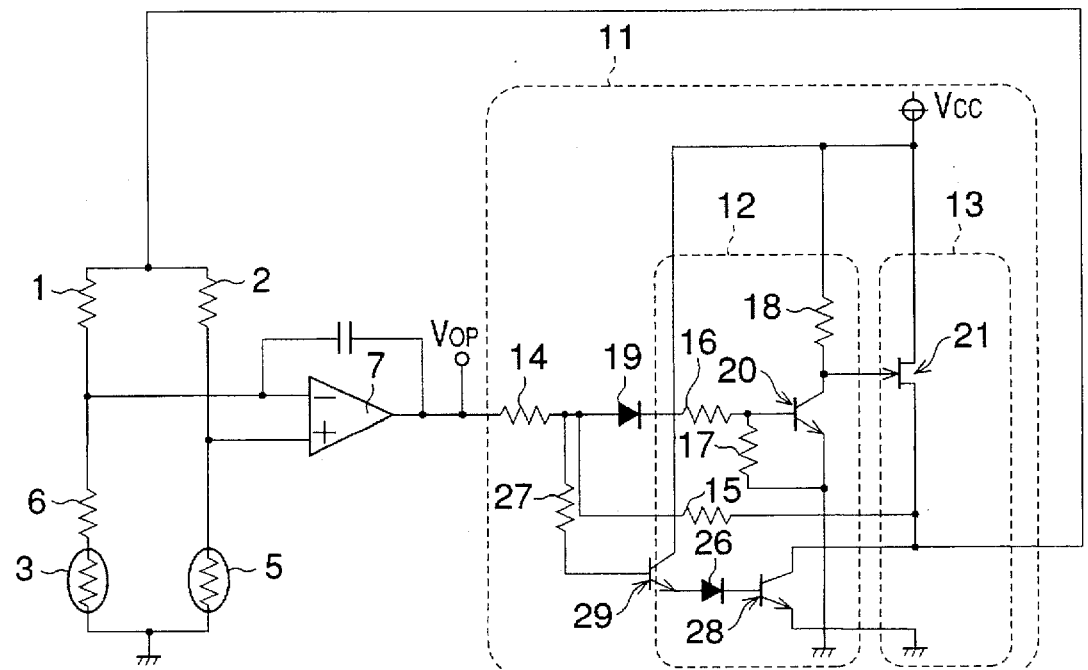
FIG. 12 is a circuit diagram showing still another embodiment of a thermally sensing type flowing velocity measuring apparatus according to the present invention.
Figure 13:
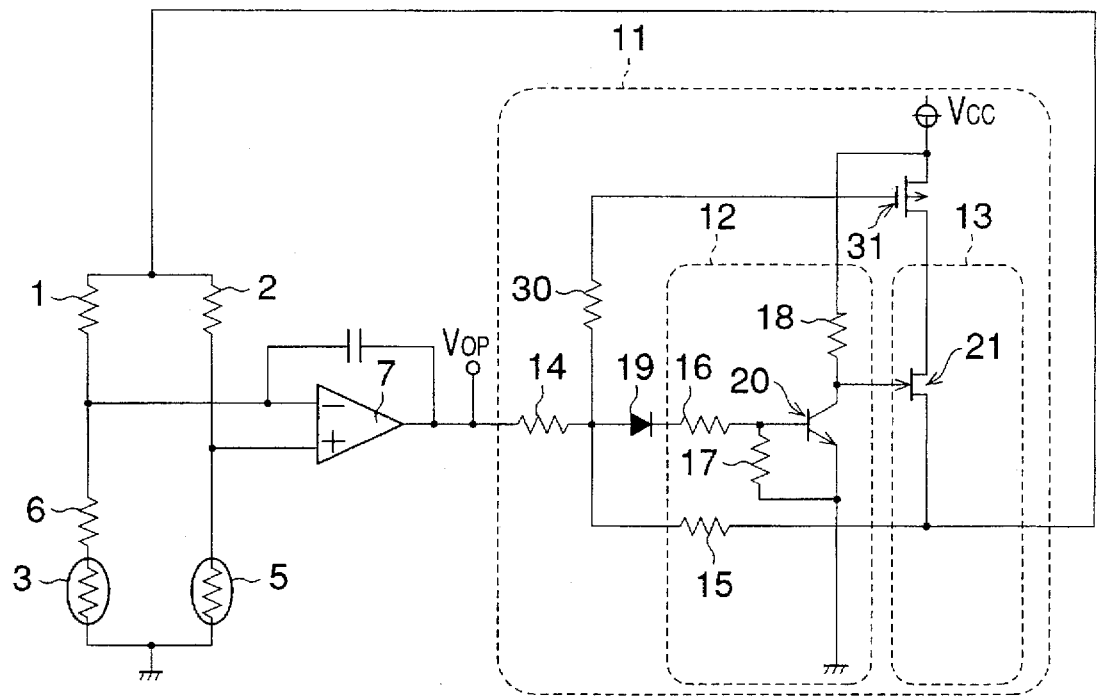
FIG. 13 is a circuit diagram showing still another embodiment of a thermally sensing type flowing velocity measuring apparatus according to the present invention.
Figure 14:
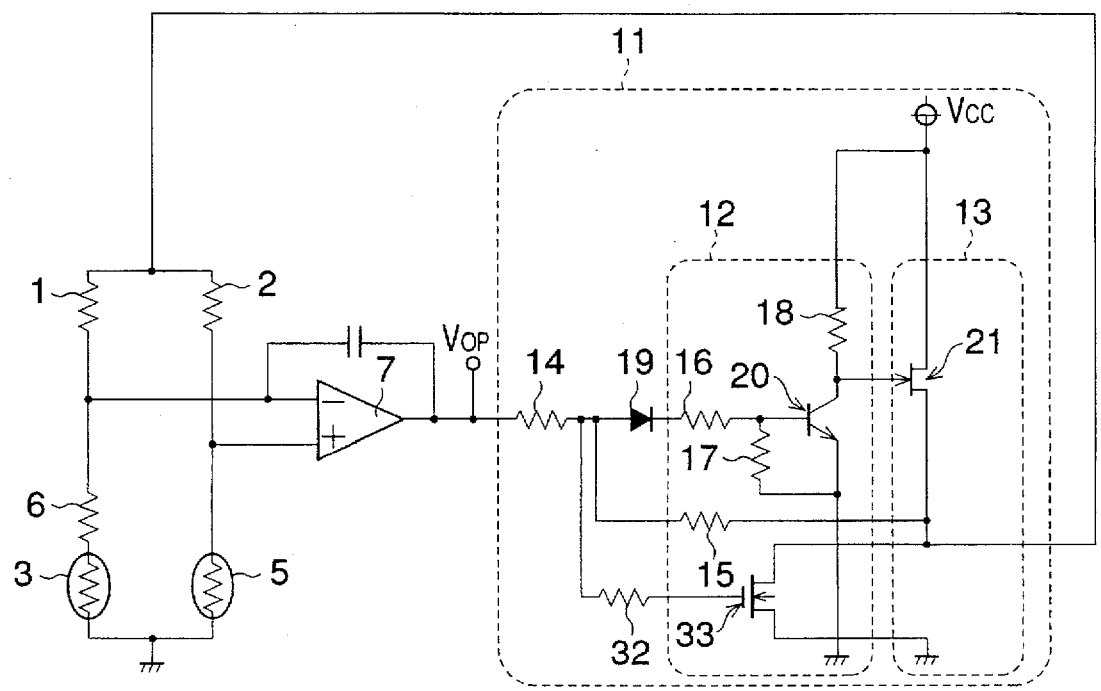
FIG. 14 is a circuit diagram showing still another embodiment of a thermally sensing type flowing velocity measuring apparatus according to the present invention.
Figure 15:
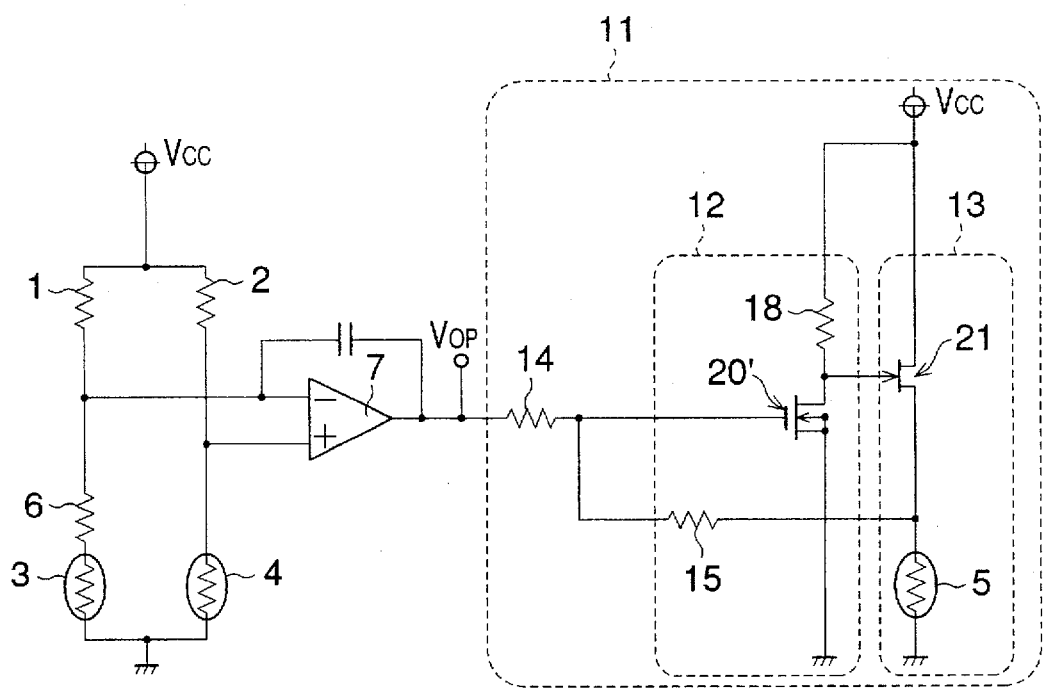
FIG. 15 is a circuit diagram showing still another embodiment of a thermally sensing type flowing velocity measuring apparatus according to the present invention.
Figure 16:
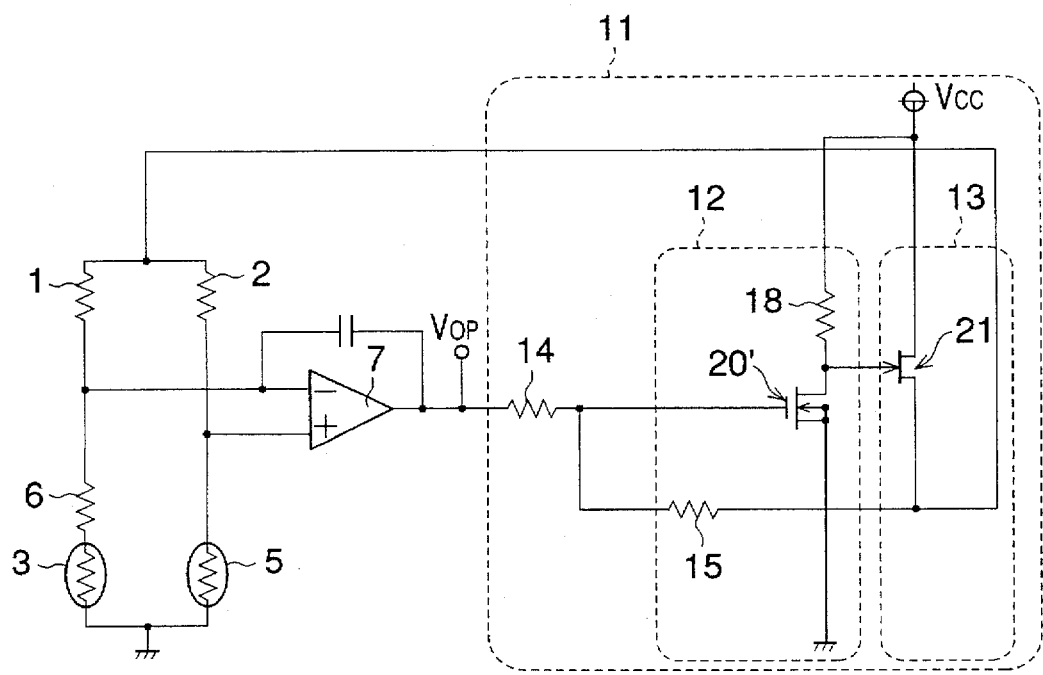
FIG. 16 is a circuit diagram showing still another embodiment of a thermally sensing type flowing velocity measuring apparatus according to the present invention.
Figure 17:
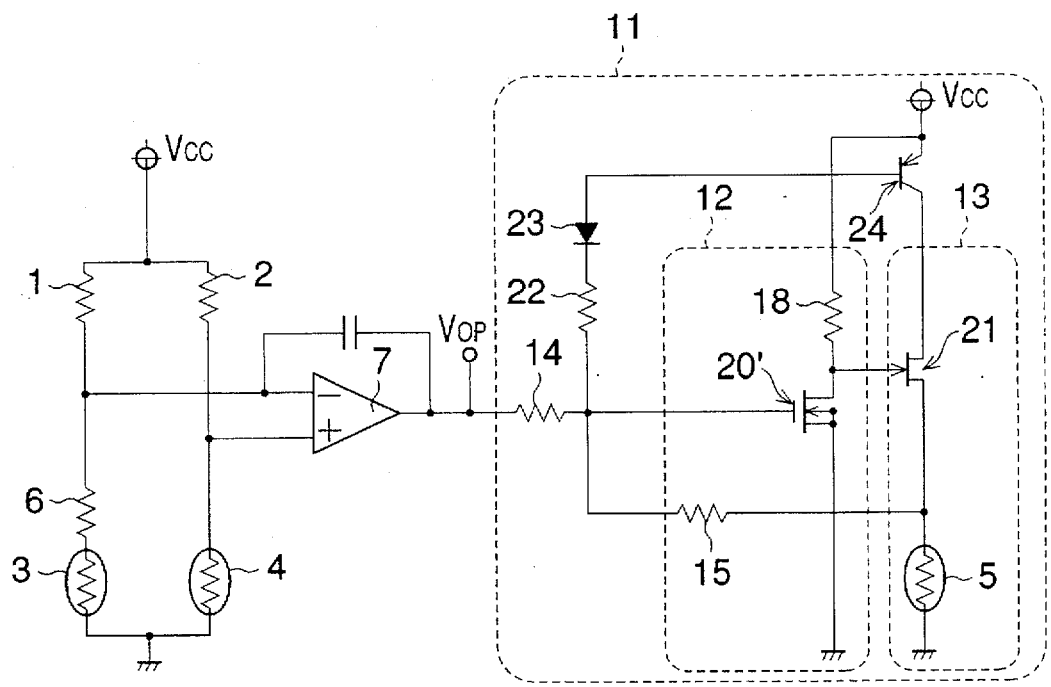
FIG. 17 is a circuit diagram showing still another embodiment of a thermally sensing type flowing velocity measuring apparatus according to the present invention.
Figure 18:
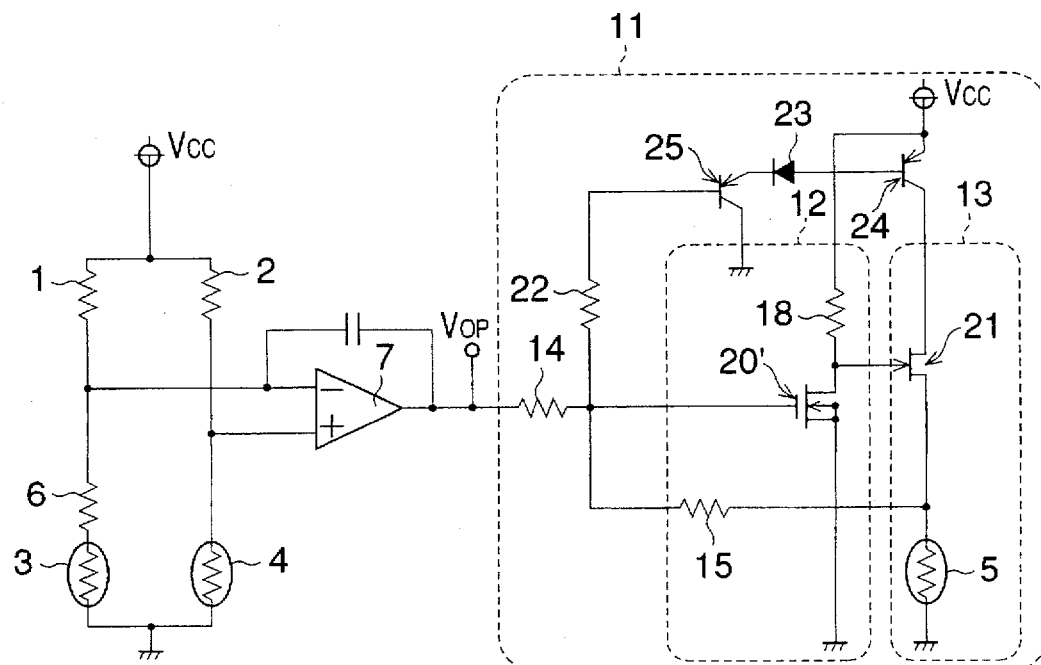
FIG. 18 is a circuit diagram showing still another embodiment of a thermally sensing type flowing velocity measuring apparatus according to the present invention.
Figure 19:
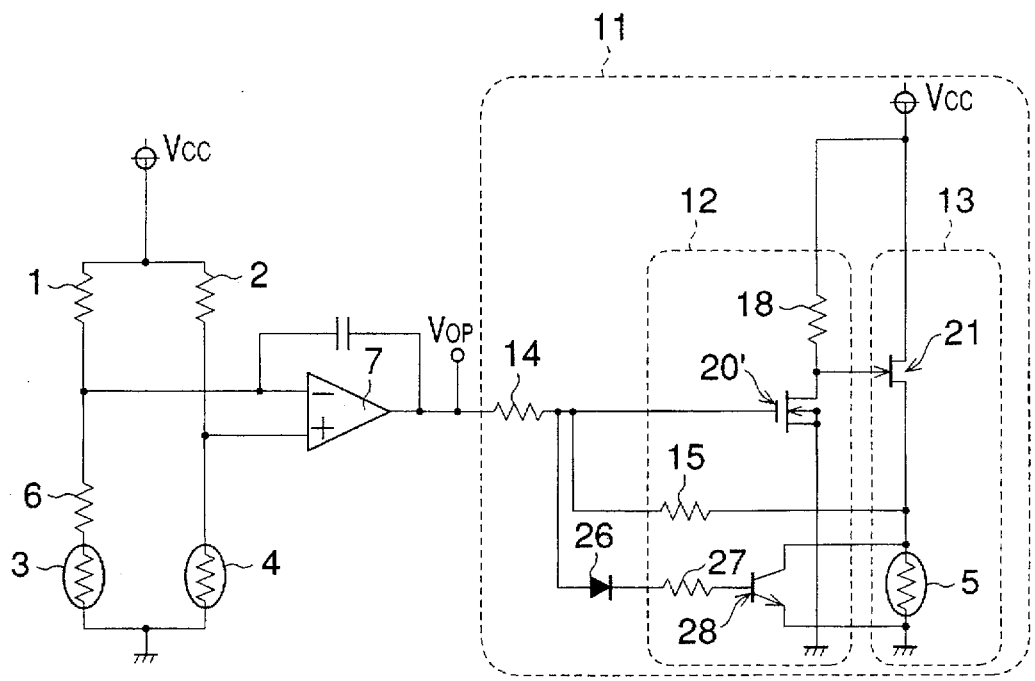
FIG. 19 is a circuit diagram showing still another embodiment of a thermally sensing type flowing velocity measuring apparatus according to the present invention.
Figure 20:
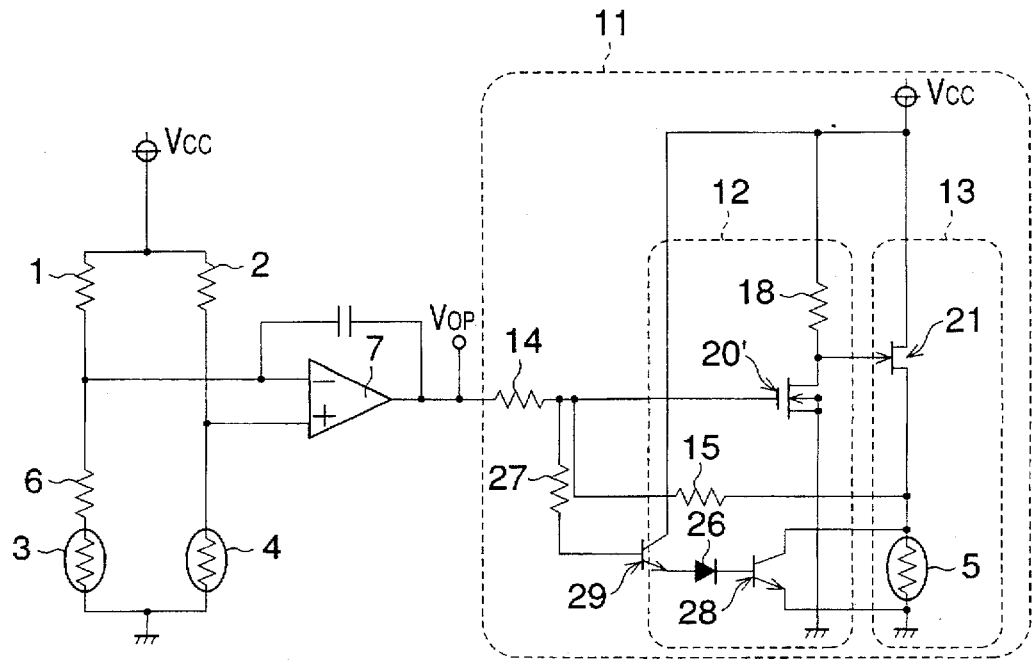
FIG. 20 is a circuit diagram showing still another embodiment of a thermally sensing type flowing velocity measuring apparatus according to the present invention.
Figure 21:
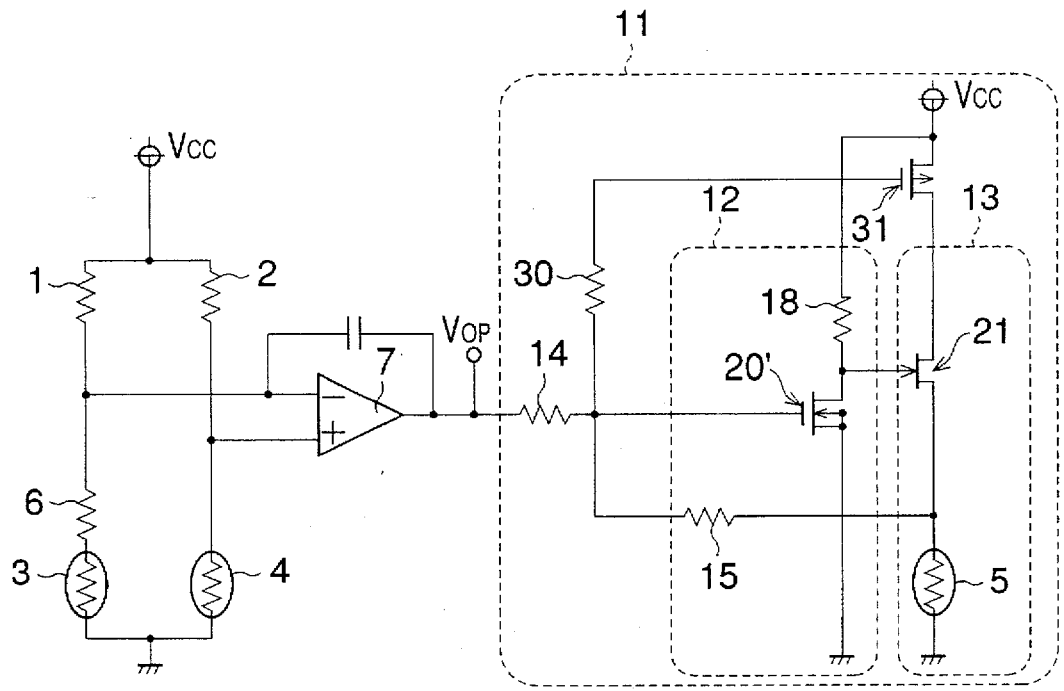
FIG. 21 is a circuit diagram showing still another embodiment of a thermally sensing type flowing velocity measuring apparatus according to the present invention.
Figure 22:
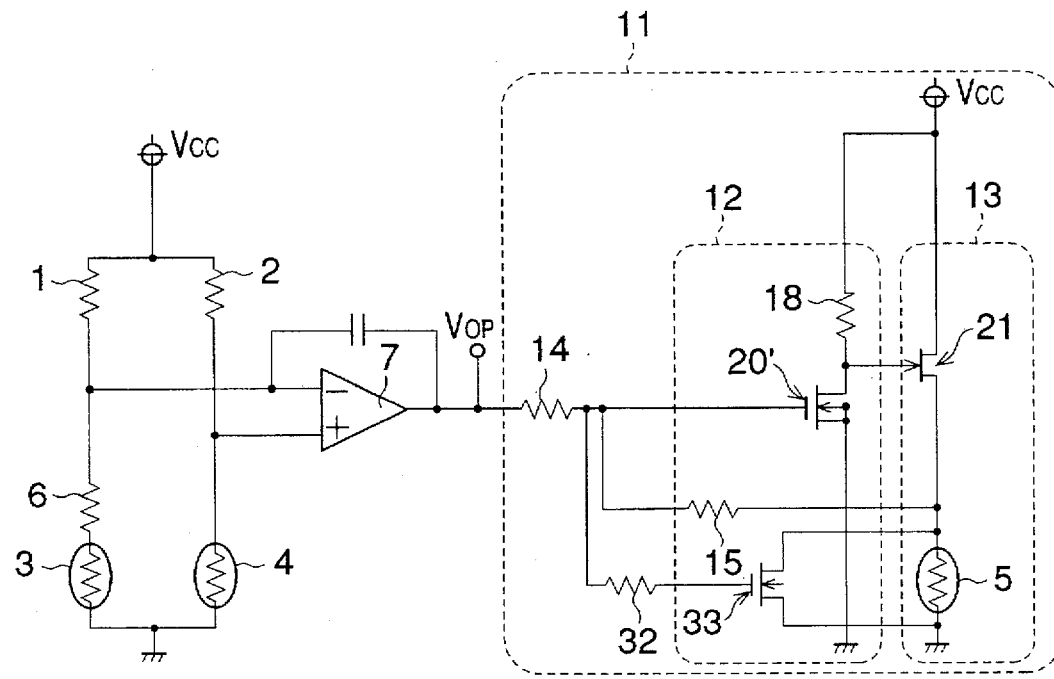
FIG. 22 is a circuit diagram showing still another embodiment of a thermally sensing type flowing velocity measuring apparatus according to the present invention.
Figure 23:
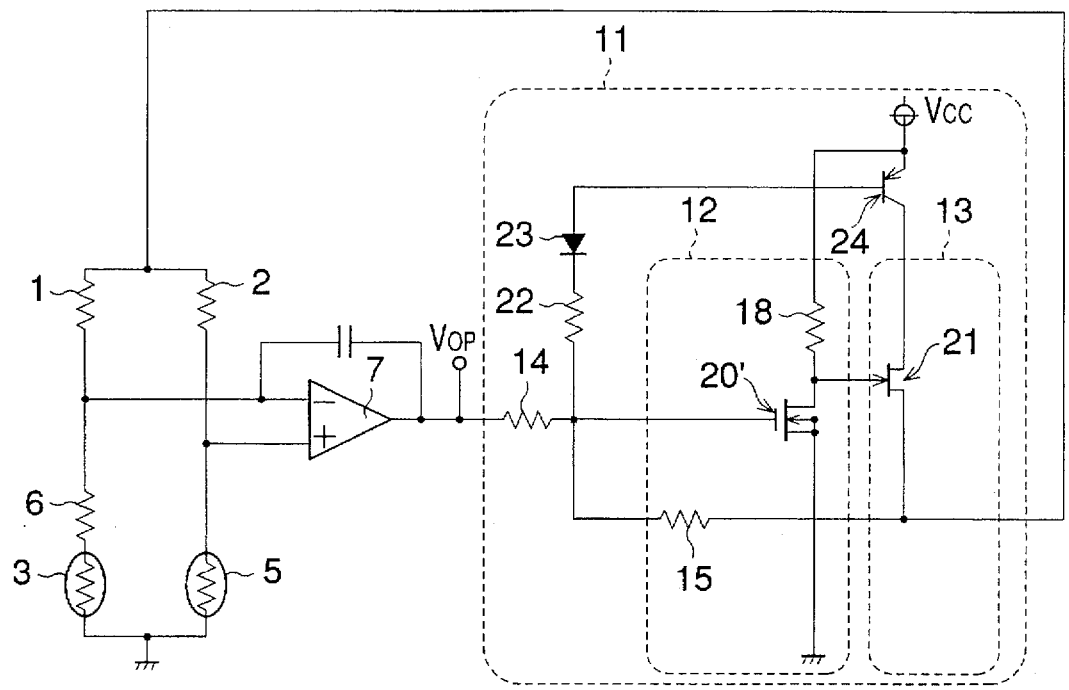
FIG. 23 is a circuit diagram showing still another embodiment of a thermally sensing type flowing velocity measuring apparatus according to the present invention.
Figure 24:
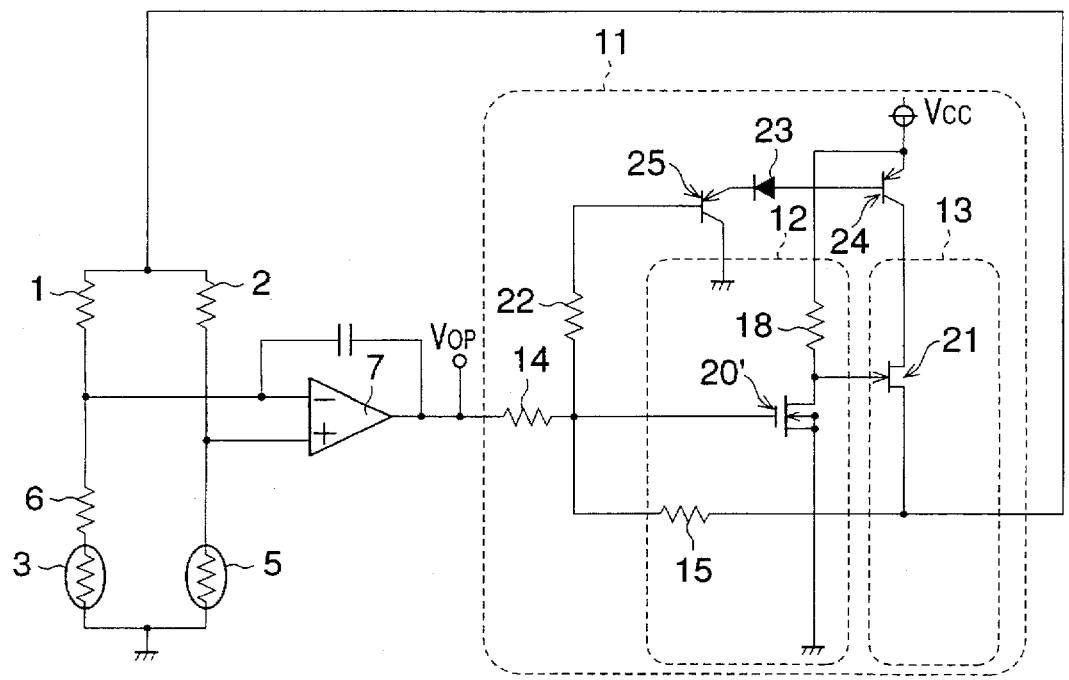
FIG. 24 is a circuit diagram showing still another embodiment of a thermally sensing type flowing velocity measuring apparatus according to the present invention.
Figure 25:
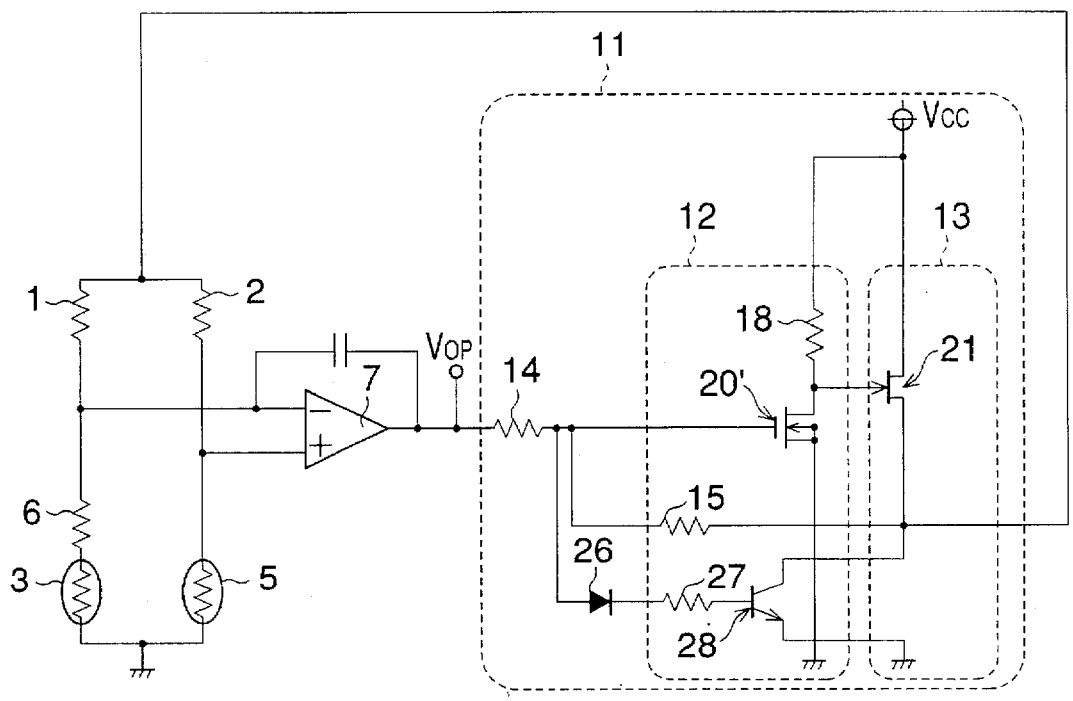
FIG. 25 is a circuit diagram showing still another embodiment of a thermally sensing type flowing velocity measuring apparatus according to the present invention.
Figure 26:
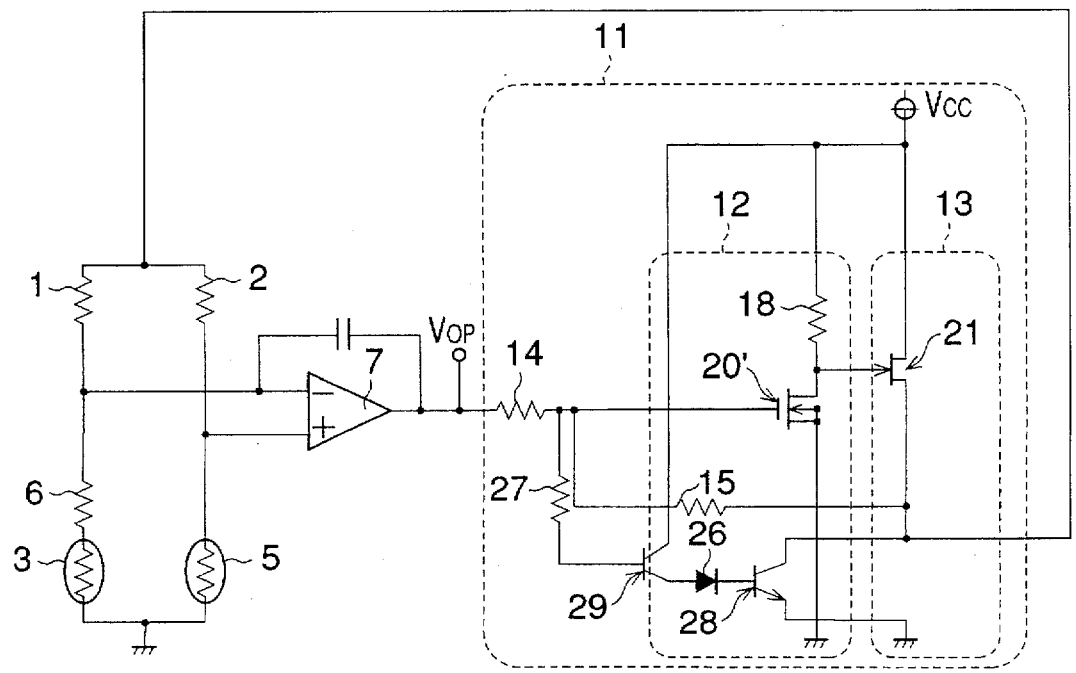
FIG. 26 is a circuit diagram showing still another embodiment of a thermally sensing type flowing velocity measuring apparatus according to the present invention.
Figure 27:
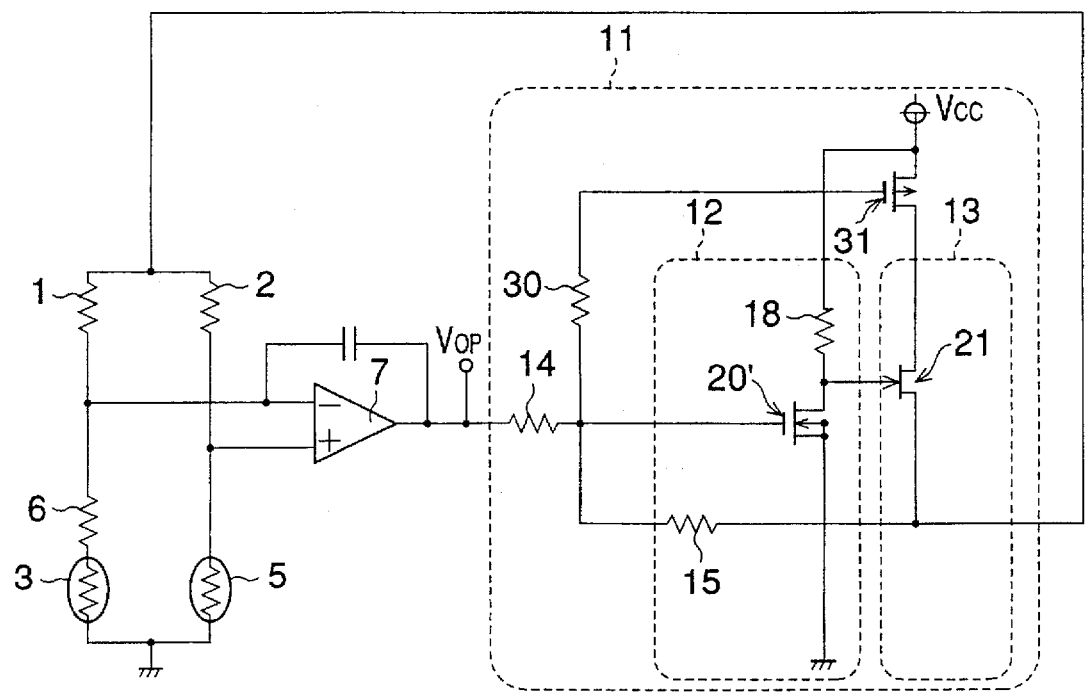
FIG. 27 is a circuit diagram showing still another embodiment of a thermally sensing type flowing velocity measuring apparatus according to the present invention.
Figure 28:
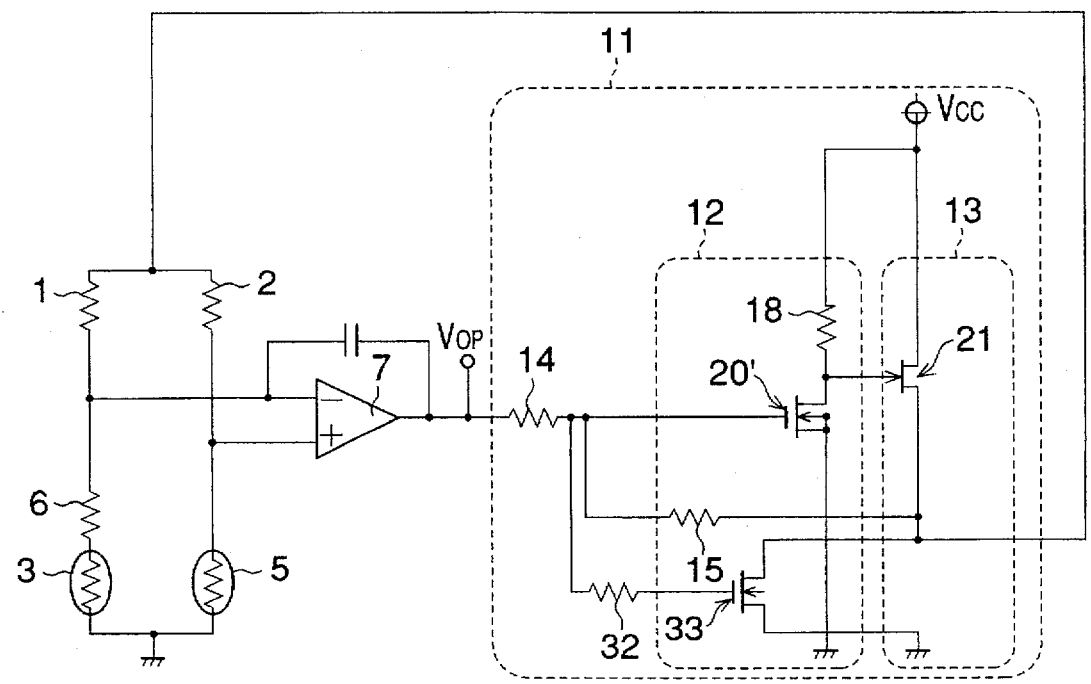
FIG. 28 is a circuit diagram showing still another embodiment of a thermally sensing type flowing velocity measuring apparatus according to the present invention.

The buffer circuit 11 is constructed with the emitter-grounded amplifying circuit 12 and the source follower 13 by use of the junction type FET 21. The resistors 14 and 15 are the ones for determining the feedback ratio of the buffer circuit 11. Hereupon, it is noteworthy that, in comparison with the circuit shown in FIG. 12, since the buffer circuit 11 turns out to be in an inverted polarity, the polarity of the input terminal of the differential amplifier 7 is also inversed.

For instance, in case that the temperature of the heater temperature sensor 4 is lower than the temperature setting value, in other words, when the voltage of the non-inverted terminal is lower than that of the inverted terminal, the differential amplifier 7 outputs a voltage near the ground potential level voltage. The output generated from the differential amplifier 7 is inputted to the base terminal of the emitter-grounded amplifying circuit 12. However, at this time, since the NPN transistor is in a state of "OFF", the collector potential of the NPN transistor 20 rises almost to the power source voltage level. The output of the emitter-grounded amplifier is connected to the heater 5 through the source follower 13 by use of the junction type FET 21, and thereby the heater 5 is heated.

As a result, the negative feedback operation is done such that both of the temperature and resistance value of the heater temperature sensor 4 increase and thereby the bridge circuit is put in a balanced condition.

On the contrary, when the output of the differential amplifier 7 is high, the NPN transistor 20 is in a state of "ON" and thereby the collector potential is in a state of being lowered to the saturated voltage between the collector and emitter of the NPN transistor 20.

Conventionally, in particular in case that the power source voltage is low, there arises a problem to be solved that the output range of the differential amplifier 7 is not sufficient due to the saturation of the operational amplifier and thereby the swinging of the voltage of the heater 5 cannot make large. However, according to the present invention, the possible voltage range of the heater 5 can be enlarged from the cutting-off voltage between the collector and emitter of the NPN transistor 20 to the power source voltage. And further, since the output resistance value is decreased by disposing the source follower 13, the load of low resistance value can be driven sufficiently. Furthermore, since the input resistance value is very high, the problem of the voltage drop due to the voltage $V_{BE}$ between the base and emitter of the emitter follower. Moreover, in case that there exists a margin in the power source voltage, it is allowed to employ a MOS FET instead of the junction type FET 21 in order to construct the source follower 13. In such manner, it is possible to construct the buffer circuit of high input resistance value.

Figure 2:
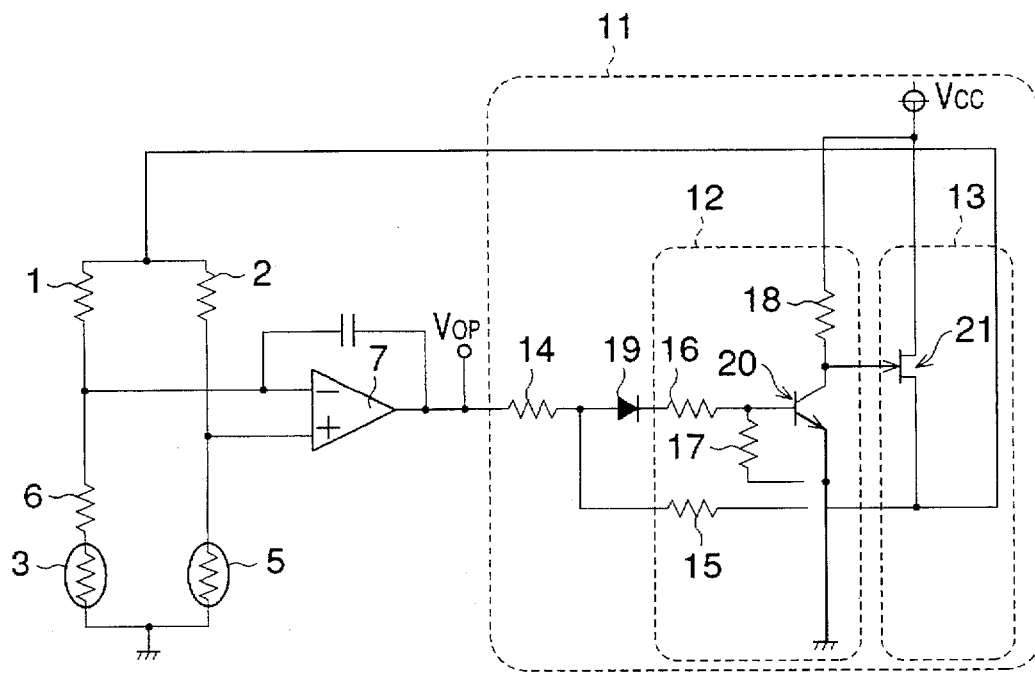
FIG. 2 is a circuit diagram showing another embodiment of a thermally sensing type flowing velocity measuring apparatus according to the present invention.

Next, the second status of the embodiment is explained. FIG. 2 is a construction diagram (circuit diagram) for explaining another embodiment of the thermally sensing type flowing velocity measuring apparatus according to the present invention. The reference numerals in FIG. 2 are same as those in FIG. 1.

FIG. 2 shows the case of employing a directly heating type flowing velocity sensor.

In the bridge circuit shown in FIG. 1, the heater 5 is connected in series to the second reference resistor 2. In the case of employing such directly heating type sensor, since the voltage swinging of the heater 5 is limited by the voltage drop across the second reference resistor 2, the problem of the decrease of the output voltage range of the differential amplifier 7 due to the saturation of the operational amplifier can be solved according to the present invention. It is very meaningful.

Figure 3:
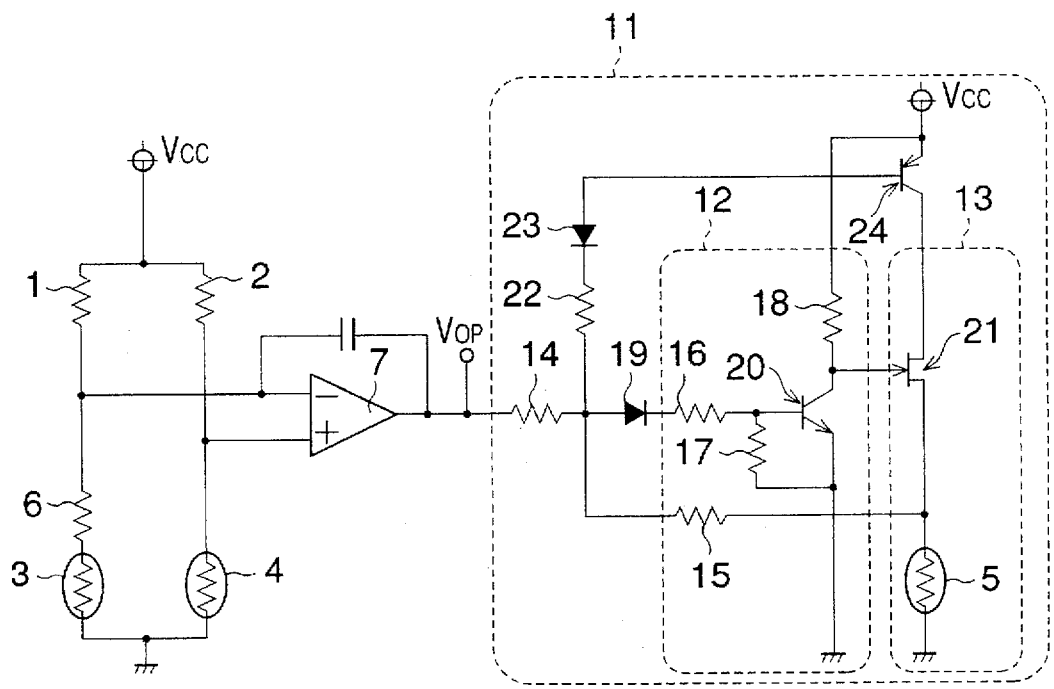
FIG. 3 is a circuit diagram showing still another embodiment of a thermally sensing type flowing velocity measuring apparatus according to the present invention.

Next, the third status of the embodiment is explained. FIG. 3 is a construction diagram (circuit diagram) for explaining still another embodiment of the thermally sensing type flowing velocity measuring apparatus according to the present invention. FIG. 3 shows the case of employing an indirectly heating type flowing velocity sensor.

In FIG. 3, the reference numeral 22 represents a resistor, 23 a diode, and 24 a PNP transistor. As to the other reference numerals, same numeral is attached to the portion performing same function as that of FIG. 1.

The third status of the embodiment, as shown in FIG. 3 for example, provides an emitter-grounded circuit by use of the PNP transistor 24 at the drain side of the source follower 13 shown in FIG. 1. In FIG. 1, when the output of the differential amplifier 7 rises up, the output of the emitter-grounded amplifier 12 drops almost to the ground level potential. On this occasion, it is desirable to lower the output of the buffer circuit 11 almost to the ground level potential in order to enlarge the output voltage range of the buffer circuit 11.

However, on many occasions, the voltage at the source terminal of the junction type FET does not drop completely to the ground level potential due to the property thereof. In order to solve such problem, the emitter-grounded circuit by use of the PNP transistor 24 is provided at the drain side of the source follower 13. When the output voltage of the differential amplifier 7 rises up, the PNP transistor 24 turns off and in consequence the output of the buffer circuit 11 is forcibly lowered to the ground level potential. On the other hand, when the output voltage of the differential amplifier 7 is low, the PNP transistor 24 turns on and thereby the electric potential of the saturated voltage $V_{CE(sat)}$ of the PNP transistor 24 is applied to the transistor between the collector and emitter thereof.

Consequently, by employing a transistor of small saturated voltage $V_{CE(sat)}$ between the collector and emitter as the PNP transistor 24, the output voltage range can be extended from the ground level potential to the power source voltage. In such construction, it is possible to construct the flowing velocity sensor driving circuit capable of supplying high electric power to the heater 5.

Figure 4:
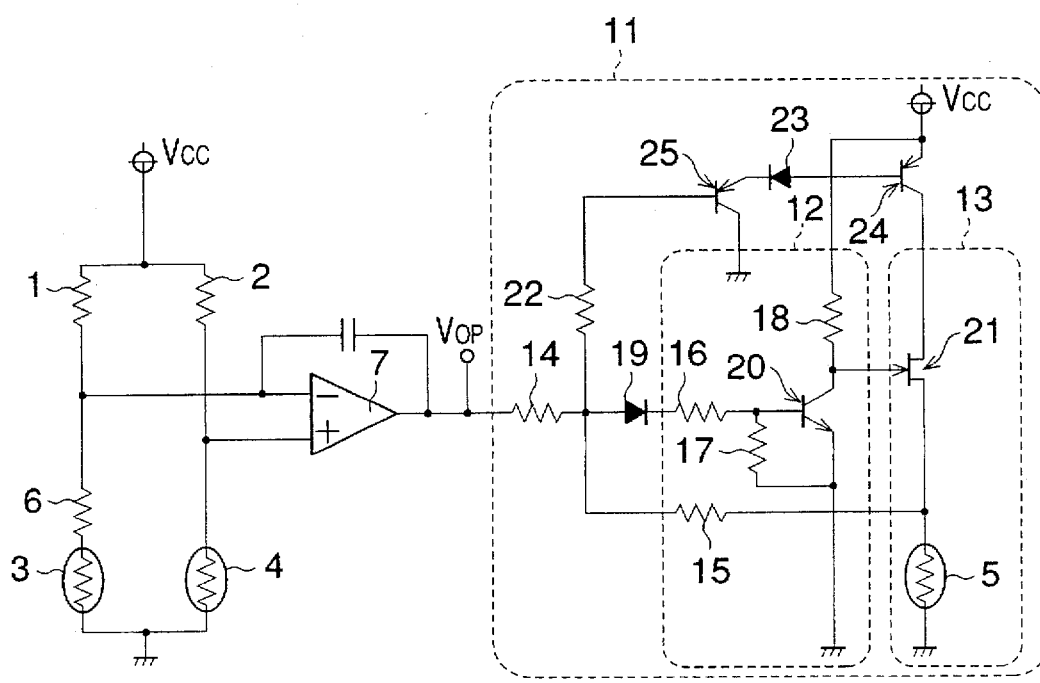
FIG. 4 is a circuit diagram showing still another embodiment of a thermally sensing type flowing velocity measuring apparatus according to the present invention.

Next, the fourth status of the embodiment is explained. FIG. 4 is a construction diagram (circuit diagram) for explaining still another embodiment of the thermally sensing type flowing velocity measuring apparatus according to the present invention. FIG. 4 also shows the case of employing an indirectly heating type flowing velocity sensor. In FIG. 4, the reference numeral 25 represents a PNP transistor, and same reference numeral is attached to the part performing same function as that of FIG. 3.

Regarding the fourth status of the embodiment, in the third status, a transistor is connected to the preceding stage of the emitter-grounded circuit in order to construct the Darlington connection. For instance, in the circuit as shown in FIG. 3, the PNP transistor does not turn off until the output voltage of the differential amplifier 7 is saturated, on some occasions. The collector current of the PNP transistor 24 flows for heating the heater 5. And further, since the collector current of the PNP transistor 24 occupies almost all of the circuit current, the base current thereof also becomes rather large.

Namely, the input resistance value of the emitter-grounded circuit decreases and the base current flows into the output terminal of the operational amplifier, and thereby the output voltage range of the differential amplifier 7 can be made narrow. If the PNP transistor 25 is added to the preceding stage of the transistor 24 in order to construct the Darlington connection, not only the PNP transistor 24 starts to turn off but the base current can be made small even though the output of the differential amplifier 7 is not so high.

Figure 5:
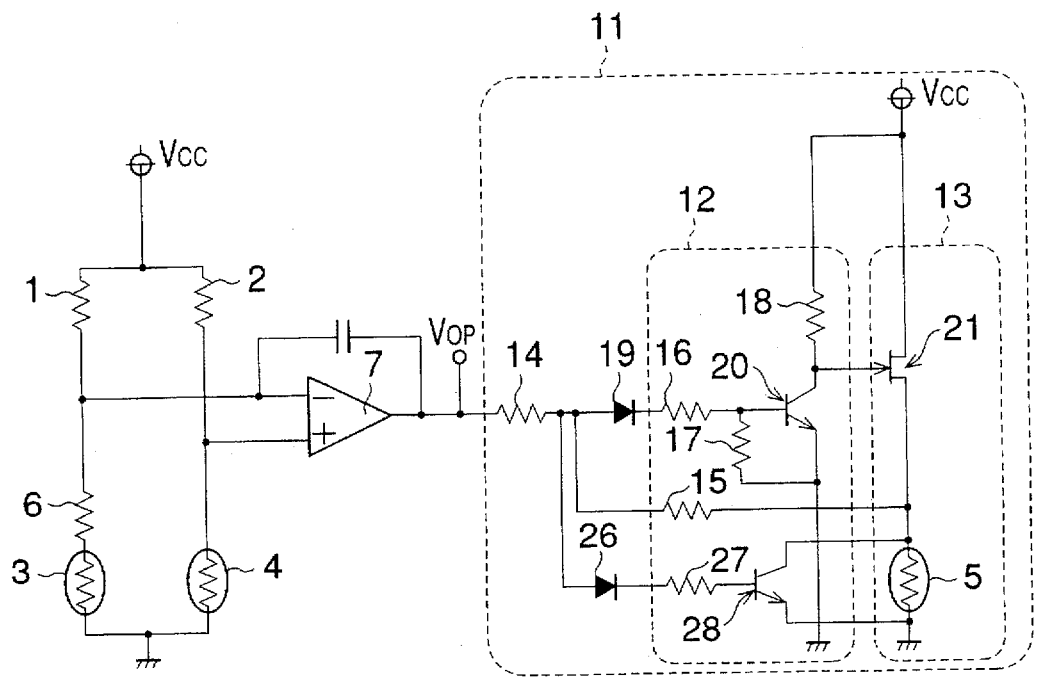
FIG. 5 is a circuit diagram showing still another embodiment of a thermally sensing type flowing velocity measuring apparatus according to the present invention.

Next, the fifth status of the embodiment is explained. FIG. 5 is a construction diagram (circuit diagram) for explaining still another embodiment of the thermally sensing type flowing velocity measuring apparatus according to the present invention. FIG. 5 also shows the case of employing an indirectly heating type flowing velocity sensor. In FIG. 5, the reference numeral 26 represents a diode, 27 a resistor, and 28 an NPN transistor, and same reference numeral is attached to the part performing same function as that of FIG. 4.

In the fifth status of the embodiment, for instance as shown in FIG. 5, the emitter-grounded circuit by use of the NPN transistor 28 is provided in parallel with the heater 5 at the source side of the source follower 13. As in the case of the third status of the embodiment, when the output of the emitter-grounded amplifier 12 is at the low level, the voltage at the source terminal does not drop completely to the ground level voltage due to the property of the junction type FET 21, on many occasion. In order to solve the above problem, the emitter-grounded circuit by use of the NPN transistor 24 is provided in parallel with the heater 5 at the source side of the source follower.

When the output voltage of the differential amplifier 7 rises up, the NPN transistor 28 is put in a state of "ON", the output of the buffer circuit 11 is forcibly lowered to the ground level potential (to state strictly, saturated voltage $V_{CE(sat)}$ between the collector and emitter of the NPN transistor 28). When the output voltage of the differential amplifier 7 is at low level, the NPN transistor 28 is put in a state of "OFF".

Consequently, by employing a transistor of small saturated voltage $V_{CE(sat)}$ between the collector and emitter as the NPN transistor 28, it is possible to construct the flowing velocity sensor driving circuit in which the output voltage range can be made wide from the ground level potential to the power source voltage and a high electric power can be supplied to the heater 5.

Figure 6:
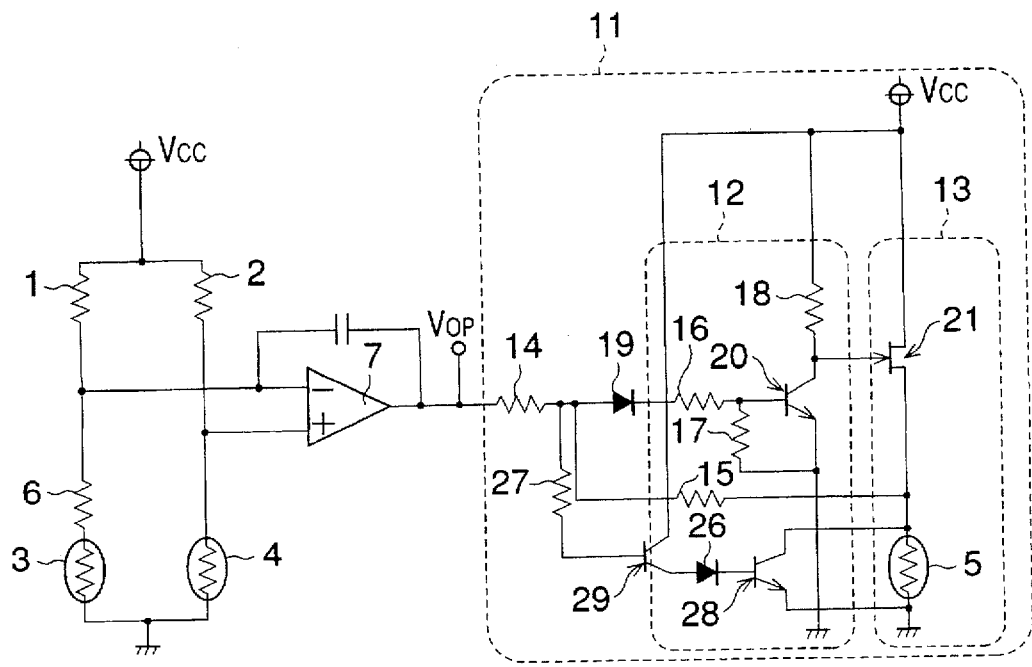
FIG. 6 is a circuit diagram showing still another embodiment of a thermally sensing type flowing velocity measuring apparatus according to the present invention.

Next, the sixth status of the embodiment is explained. FIG. 6 is a construction diagram (circuit diagram) for explaining still another embodiment of the thermally sensing type flowing velocity measuring apparatus according to the present invention. FIG. 6 also shows the case of employing an indirectly heating type flowing velocity sensor. In FIG. 6, the reference numeral 29 represents an NPN transistor, and same reference numeral is attached to the part performing same function as that of FIG. 5.

Regarding the sixth status of the embodiment, in the fifth status of the embodiment, the emitter-grounded circuit by use of the transistor is constructed with the Darlington connection. For instance, in the circuit as shown in FIG. 5, in spite that the output voltage of the differential amplifier 7 is not so high, the NPN transistor 28 turns on, on some occasions. Furthermore, under such condition, since the voltage applied to the heater 5 is considerably high and the collector current of the NPN transistor 28 turns out to be very large, the base current of the NPN transistor 28 becomes rather large and the input resistance value of the emitter-ground circuit becomes rather small.

In order to solve such problems, as shown in FIG. 6, since the NPN transistor 29 is added to the preceding stage of the emitter-grounded circuit by use of the NPN transistor 28 in order to construct the Darlington connection, the output of the differential amplifier 7 rises up when the NPN transistor 28 starts to turn off, the base current can be made small, and the input resistance value can be made large.

Figure 7:
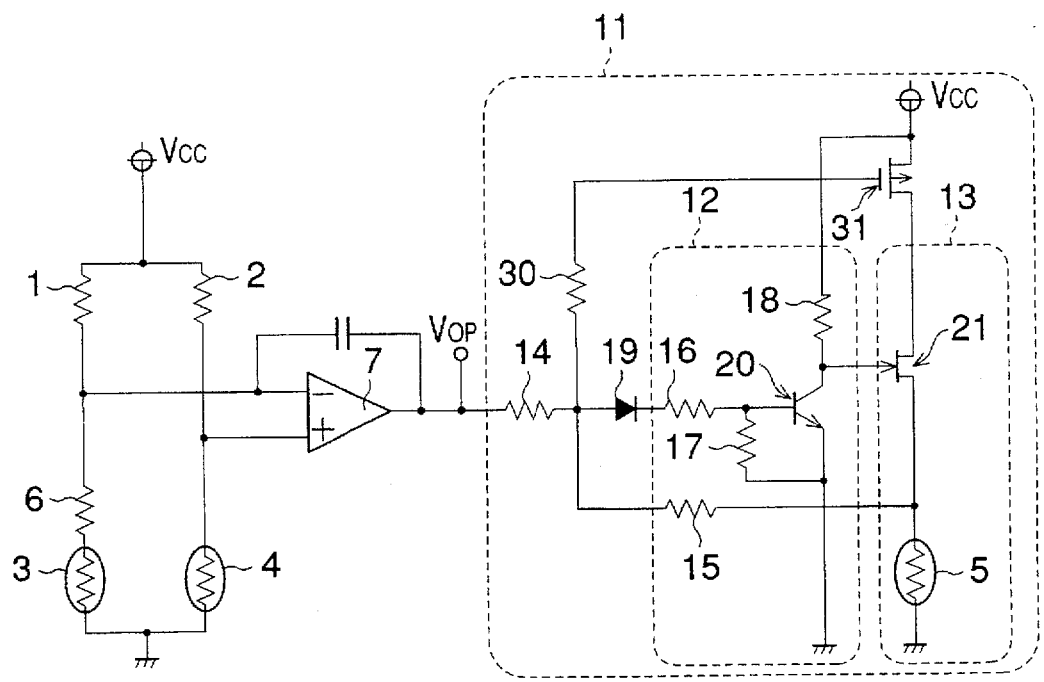
FIG. 7 is a circuit diagram showing still another embodiment of a thermally sensing type flowing velocity measuring apparatus according to the present invention.

Next, the seventh status of the embodiment is explained. FIG. 7 is a construction diagram (circuit diagram) for explaining still another embodiment of the thermally sensing type flowing velocity measuring apparatus according to the present invention. FIG. 7 also shows the case of employing an indirectly heating type flowing velocity sensor. In FIG. 7, the reference numeral 30 represents a resistor, and 31 a P-channel MOS FET (Metal Oxide Semiconductor Field Effect Transistor: Insulated Gate Type FET), and same reference numeral is attached to the part performing same function as that of FIG. 3.

As one example of the seventh status of the embodiment, FIG. 7 is the construction diagram (circuit diagram) for showing the circuit example constructing the source-grounded circuit with the P-channel MOS FET 31 instead of the emitter-grounded circuit shown in FIG. 3.

In FIG. 7, as in the case of employing the circuit shown in FIG. 3, it is possible to construct the flowing velocity sensor driving circuit capable of outputting the voltage in a wide range extending from the ground level potential to the power source voltage. Moreover, it is possible to construct the buffer circuit of higher input resistance value, compared with the circuit shown in FIG. 3.

The seventh status of the embodiment is further characterized in that the number of the circuit elements can be decreased, compared with the circuit constructed with the Darlington connection as shown in FIG. 4.

Figure 8:
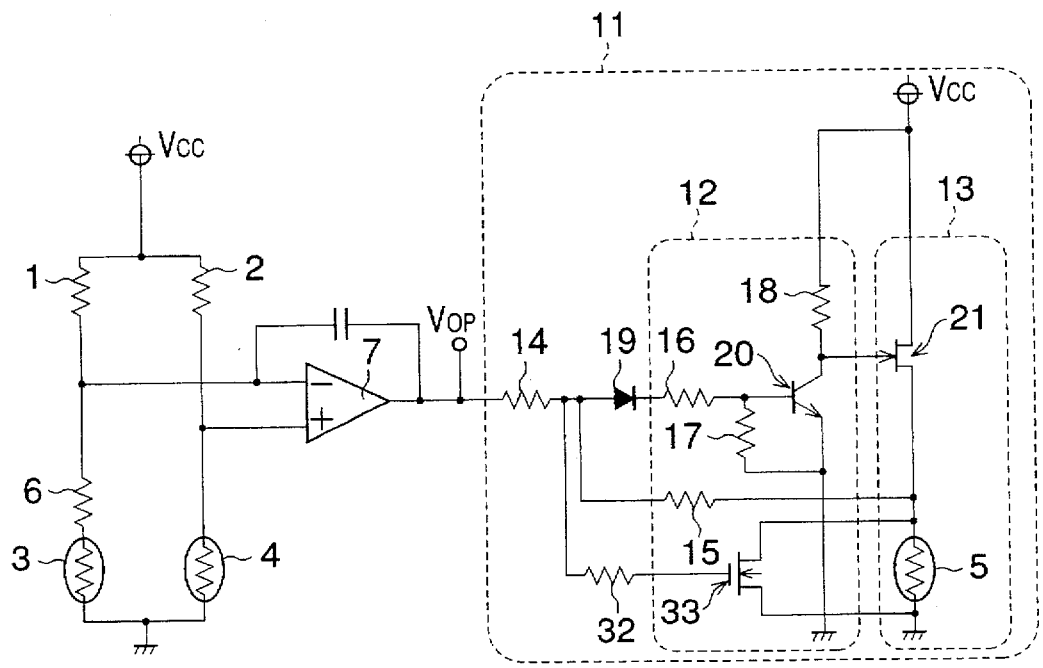
FIG. 8 is a circuit diagram showing still another embodiment of a thermally sensing type flowing velocity measuring apparatus according to the present invention.
Figure 9:
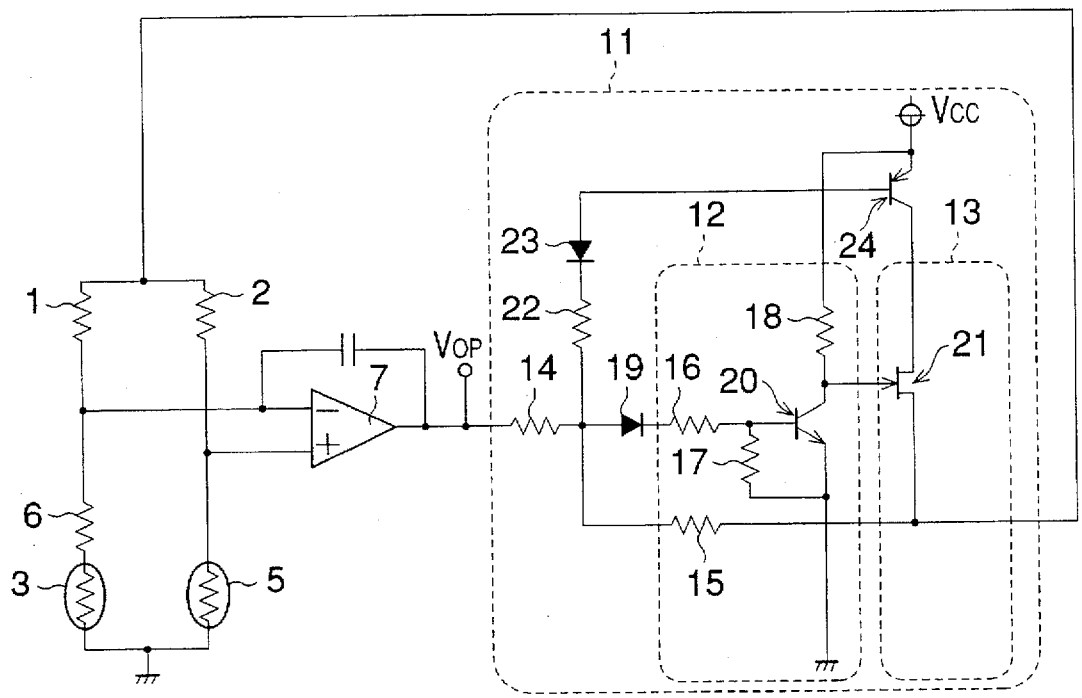
FIG. 9 is a circuit diagram showing still another embodiment of a thermally sensing type flowing velocity measuring apparatus according to the present invention.

Next, the eighth status of the embodiment is explained. FIG. 8 is a construction diagram (circuit diagram) for explaining still another embodiment of the thermally sensing type flowing velocity measuring apparatus according to the present invention. FIG. 8 also shows the case of employing an indirectly heating type flowing velocity sensor. In FIG. 8, the reference numeral 32 represents a resistor, and 33 an N-channel MOS FET, and the same reference numeral is attached to the part performing same function as that of FIG. 5.

As one example of the eighth status of the embodiment, FIG. 8 is the construction diagram (circuit diagram) for showing the circuit example constructing the source-grounded circuit with the N-channel MOS FET 33 instead of the emitter grounded circuit shown in FIG. 5.

In FIG. 8, as in the case of employing the circuit shown in FIG. 5, it is possible to construct the flowing velocity sensor driving circuit capable of outputting the voltage in a wide range extending from the ground level potential to the power source voltage. Moreover, it is possible to construct the buffer circuit of higher input resistance value, compared with the circuit shown in FIG. 5.

The eighth status of the embodiment is further characterized in that the number of the circuit elements can be decreased, compared with the circuit constructed with the Darlington connection as shown in FIG. 6.

Concerning the seventh and eighth statuses of the embodiment, it is necessary to employ the MOS FETs 31 and 33 respectively having suitable gate threshold value voltage Vth in accordance with the power source voltage. In case that there exists a margin in the power source voltage, both of the above-mentioned statuses of the embodiment are very advantageous. Furthermore, in case that the power source voltage is at a considerably low level, it is also advantageous to employ the transistor in the third through sixth statuses of the embodiment.

Figure 10:
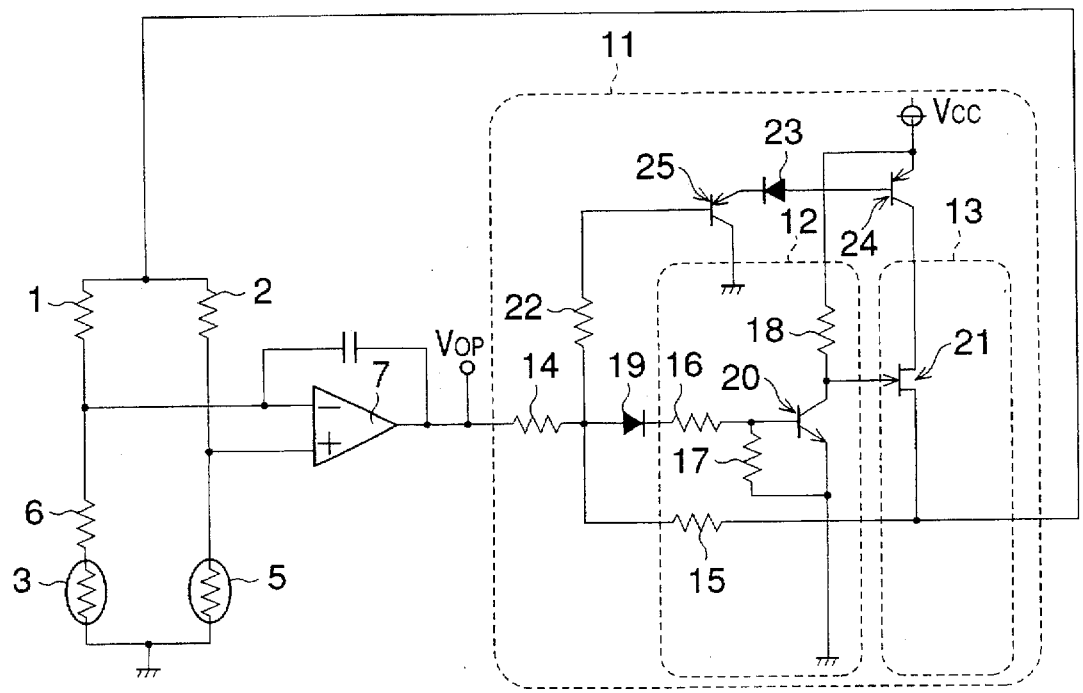
FIG. 10 is a circuit diagram showing still another embodiment of a thermally sensing type flowing velocity measuring apparatus according to the present invention.
Figure 11:
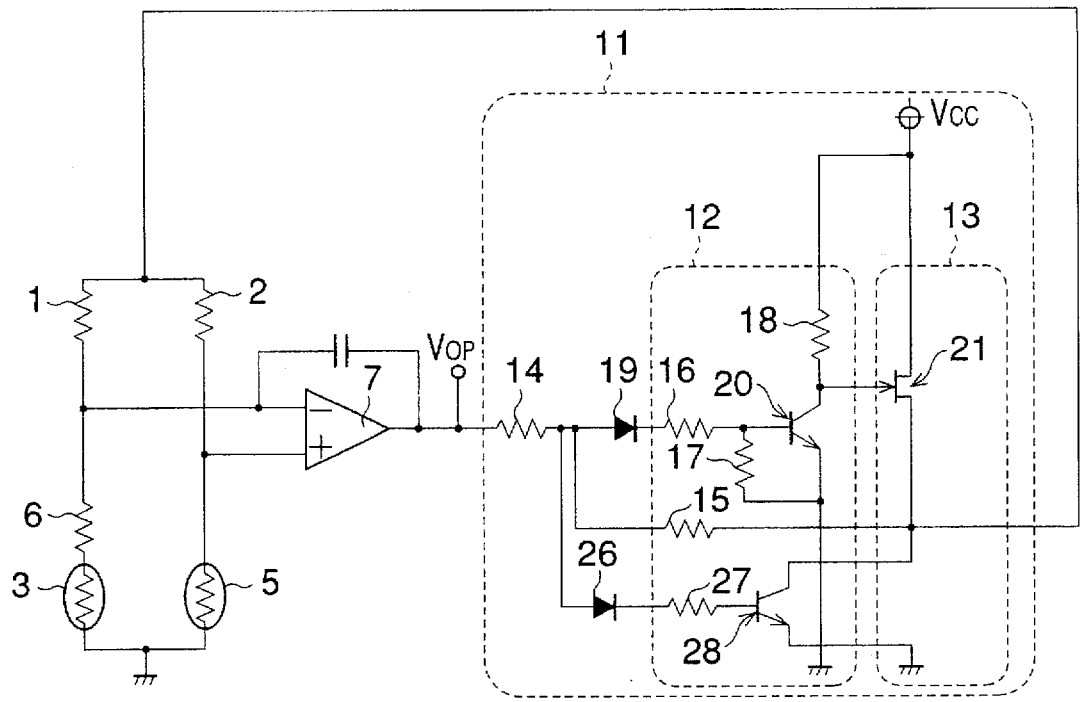
FIG. 11 is a circuit diagram showing still another embodiment of a thermally sensing type flowing velocity measuring apparatus according to the present invention.

In FIG. 10, the employed sensor is the thermally sensing type flowing velocity sensor in which the temperature coefficient of the thin film resistor is 2500 ppm (at the ambient temperature; 25° C.) and the heater 43 (corresponding to the heater 5 of the present invention) is a 3 mm-square resistor of 450Ω. In the driving circuit shown in FIG. 5, the power source Vcc is a 2.5V one-sided power source, the temperature setting value 40° C. is determined for the fluid temperature sensor 3 and the heater temperature sensor 4, and in such construction the flowing velocity measuring apparatus is driven by the method of indirectly heating.

Figure 29:
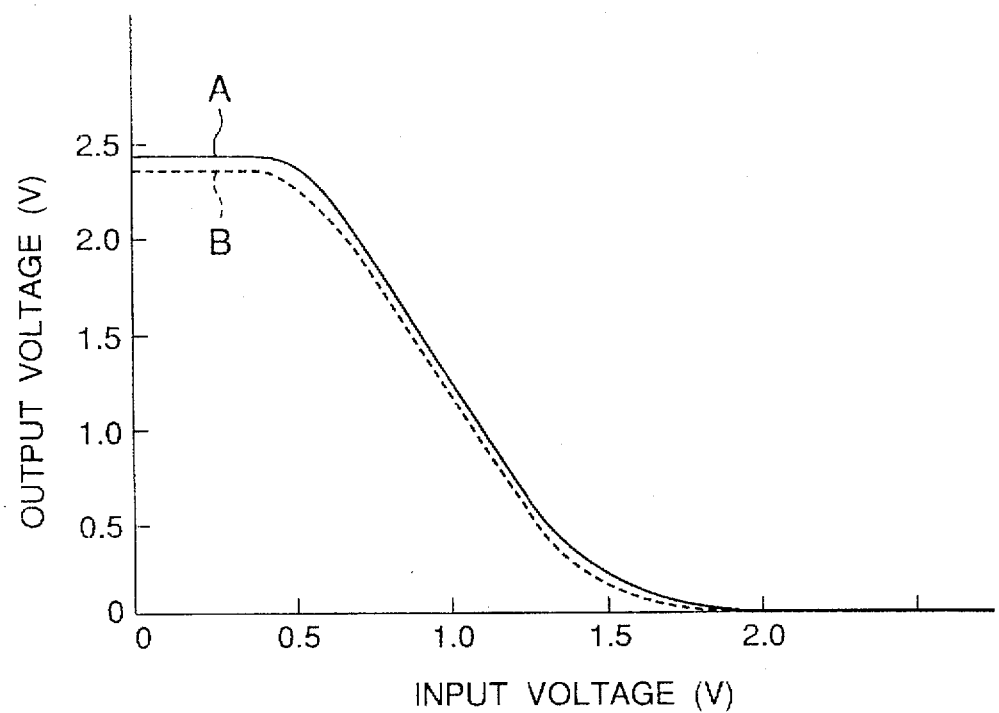
FIG. 29 is a diagram for illustrating the input/output characteristics of the buffer circuit according to the present invention.

At first, as a result of studying the input/output characteristic of the buffer circuit 11, a curve as shown in FIG. 29

Figure 30:
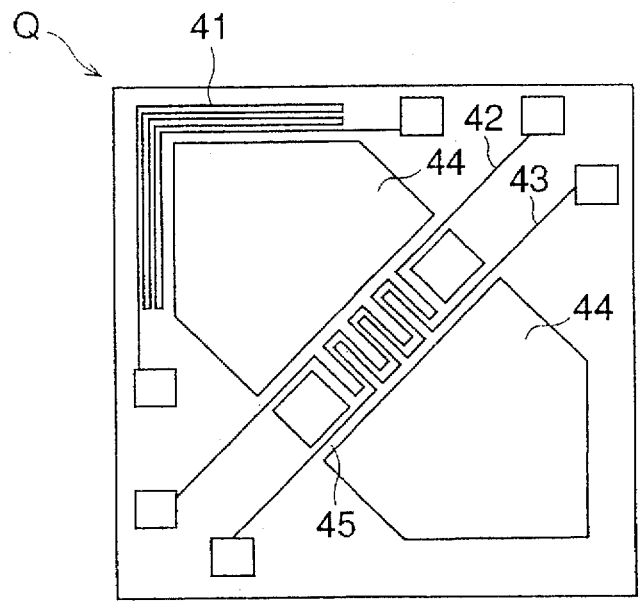
FIG. 30 is a plan view showing the construction of the conventional microbridge type flowing velocity sensor.
Figure 31:
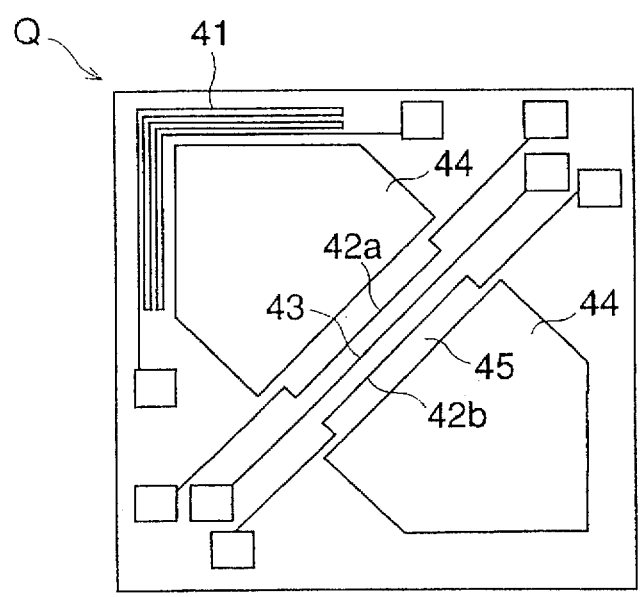
FIG. 31 is a plan view showing the other construction of the conventional microbridge type flowing velocity sensor.
Figure 32:
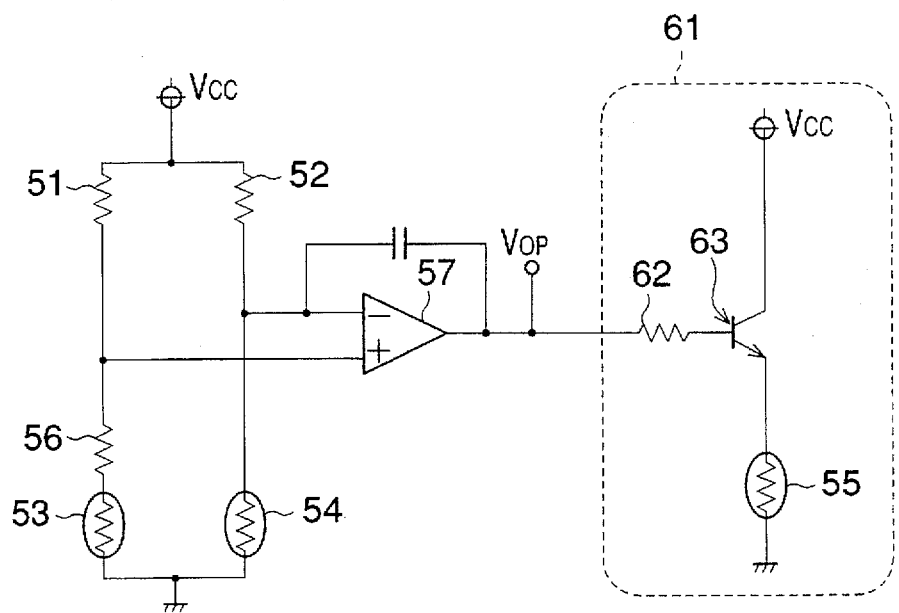
FIG. 32 is a circuit diagram showing an indirectly (side-)heating type driving circuit of the conventional microbridge type flowing velocity sensor.
Figure 33:
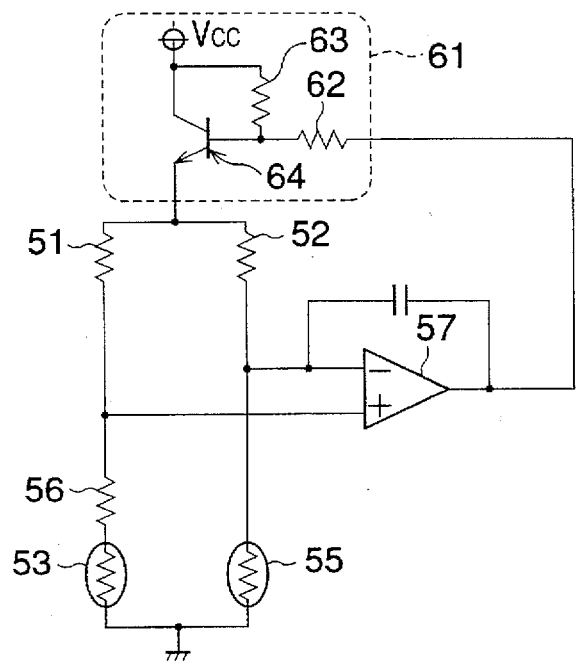
FIG. 33 is a circuit diagram showing a directly heating type driving circuit of the conventional microbridge type flowing velocity sensor.

(curve A in FIG. 29) can be obtained. The output voltage range of the operational amplifier driven by the one-sided electric power source which is employed in the differential amplifier 7 at present is 0.4V~1.8V. Since the input voltage in FIG. 29 corresponds to the output voltage of the differential amplifier 7, the range of the voltage applied to the heater 5 can be enlarged to the critical area; 0.05V~2.45V, by use of the buffer circuit 11 provided with the emitter-grounded circuit. Thereby, it turns out to be possible to heat the heater 5 to a very high temperature, even in the case of utilizing the sensor having the bridge 45 of large square measure as shown in FIG. 30. According to our experiment, in order to raise the sensor sensitivity and the measuring accuracy, it is desirable to drive the sensor having the bridge 45 of large square measure with as high temperature setting value as possible.

However, in spite of the restriction of the low-voltage and one-sided power source, it turns out to be possible to provide the driving circuit capable of measuring the flowing velocity with high accuracy. Furthermore, even in the case of employing the sensor including the heater 5 of the resistance value; 200Ω (curve B in FIG. 29), the voltage range can be enlarged to the area of 0.05V~2.35V and the flowing velocity sensor driving circuit of low output resistance value can be constructed.

ADVANTAGEOUS FUNCTIONAL EFFECTS

As is apparent from the foregoing description, according to the present invention, the following advantageous functional effects can be attained.

(1) Effect of the First Status

As a result of employing the emitter-grounded amplifier and the source follower, it turns out to be possible to provide the indirectly heating type flowing velocity sensor driving circuit in which the voltage of the power source can be easily lowered and one-sided and the area of the voltage applied to the heater can be enlarged.

(2) Effect of the Second Status

As a result of employing the emitter-grounded amplifier and the source follower, it turns out to be possible to provide the directly heating type flowing velocity sensor driving circuit in which the voltage of the power source can be easily lowered and one-sided and the area of the voltage applied to the bridge circuit can be enlarged.

(3) Effect of the Third Status

As a result of disposing the emitter-grounded circuit at the drain side of the source follower, it turns out to be possible to construct the buffer circuit in which the voltage of the power source can be easily lowered and the output thereof can sharply drop to the ground level potential.

(4) Effect of the Fourth Status

In the item (3), as a result of constructing the emitter-grounded circuit with the Darlington connection, it is possible to realize the voltage shifting and the high input resistance value, and thereby the output of the buffer circuit can sharply drop to the ground level potential.

(5) Effect of the Fifth Status

As a result of disposing the emitter-grounded circuit at the source side of the source follower, the voltage of the power source can be easily lowered, and further it is possible to construct the buffer circuit such that the output thereof can sharply drop to the ground level potential.

(6) Effect of the Sixth Status

In the item (5), as a result of constructing the emitter-grounded circuit with the Darlington connection, it is possible to realize the shifting of the operational voltage in the buffer circuit and the high input resistance value, the voltage of the power source can be easily lowered, and further it is possible to construct the flowing velocity sensor driving circuit such that the output thereof can sharply drop to the ground level potential.

(7) Effect of the Seventh Status

As a result of disposing the source-grounded circuit by use of the MOS FET at the drain side of the source follower, higher input resistance value and lower electric power consumption can be attained in comparison with the emitter-grounded circuit as described in the items (3) and (4), and further it is possible to construct the flowing velocity sensor driving circuit such that the output thereof can sharply drop to the ground level potential.

(8) Effect of the Eighth Status

As a result of disposing the source-grounded circuit by use of the MOS FET at the source side of the source follower, reduction of the employed parts number, higher input resistance value, and lower electric power consumption can be attained in comparison with the emitter-grounded circuit as described in the items (5) and (6), and further it is possible to construct the flowing velocity sensor driving circuit such that the output thereof can sharply drop to the ground level potential.

Heretofore, an indirectly-heating type thermal flowing velocity measuring apparatus has been mainly described in detail. However, the scope of the present invention is not limited only thereto. A directly-heating type thermal flowing velocity measuring apparatus can be also applied to the present invention.

Furthermore, regarding the flowing velocity measuring circuit, the scope of the present invention is not limited only to the circuit construction including emitter-grounded circuit and source follower. The other circuit construction including source-grounded circuit and source follower can be also applied to the present invention.

Since the operations of those added statuses of the embodiments (modifications) of the present invention are similar to each other, the detailed explanation thereof is omitted here.

What is claimed as new and desired to be secured by Letters Patent of the United States is:

1. A thermally sensing type flowing velocity measuring apparatus which comprises:

a substrate, a moat formed by etching said substrate, a thermally sensing type flowing velocity sensor comprising a bridge suspended over said moat, said bridge comprising an electrically insulative film formed on said substrate, a heater mounted on the bridge, a heater temperature measuring body mounted on the bridge, and a fluid temperature measuring body mounted on a part of said electrically insulative film, a flowing velocity measuring circuit for keeping a temperature difference between a temperature of said fluid temperature measuring body and a temperature of said heater temperature measuring body constant, wherein said flowing velocity measuring circuit comprises:

a bridge circuit comprising said fluid temperature measuring body, a first reference resistor connected in series with said fluid temperature measuring body, said heater temperature measuring body, a second reference resistor connected in series with said heater temperature measuring body, and a temperature setting resistor for setting said temperature difference between the temperature of said heater temperature measuring body and the temperature of said fluid temperature measuring body, a differential amplifier having an output terminal, said differential amplifier connected in series with said bridge circuit, and a buffer circuit connected to the output terminal of said differential amplifier and connected in series with the differential amplifier, wherein said buffer circuit comprises a first emitter-grounded amplifying circuit and a source follower.

2. A thermally sensing type flowing velocity measuring apparatus as defined in claim 1, wherein said buffer circuit further comprises a second emitter-grounded circuit at a drain terminal side of the source follower.

3. A thermally sensing type flowing velocity measuring apparatus as defined in claim 2, wherein said buffer circuit comprises a Darlington connection in which a second transistor is connected to an input of said second emitter-grounded circuit.

4. A thermally sensing type flowing velocity measuring apparatus as defined in claim 1, wherein said source follower has a source terminal side, and said buffer circuit comprises a third emitter-grounded circuit at the source terminal side of said source follower.

5. A thermally sensing type flowing velocity measuring apparatus as defined in claim 4, wherein said buffer circuit further connects a transistor to an input of said emitter-grounded circuit and thereby the same constructs a Darlington connection.

6. A thermally sensing type flowing velocity measuring apparatus as defined in claim 1, wherein said source follower has a drain terminal side and said buffer circuit comprises a source-grounded circuit including a field effect transistor (FET) at the drain terminal side of said source follower.

7. A thermally sensing type flowing velocity measuring apparatus as defined in claim 1, wherein said buffer circuit is provided with a source-grounded circuit including a field effect transistor (FET) at the source terminal side of said source follower.

8. A thermally sensing type flowing velocity measuring apparatus which comprises:

a substrate, a moat formed by etching said substrate, a thermally sensing type flowing velocity sensor comprising a bridge suspended over said moat, said bridge comprising an electrically insulative film formed on said substrate, a heater mounted on the bridge, a heater temperature measuring body mounted on the bridge, and a fluid temperature measuring body mounted on a part of said electrically insulative film, and a flowing velocity measuring circuit for keeping a temperature difference between a temperature of said fluid temperature measuring body and a temperature of said heater constant, wherein said flowing velocity measuring circuit comprises:

a bridge circuit comprising said fluid temperature measuring body, a first reference resistor connected in series with said fluid temperature measuring body, said heater, a second reference resistor connected in series with said heater, and a temperature setting resistor for setting said temperature difference between the temperature of said heater and the temperature of said fluid temperature measuring body, a differential amplifier having an output terminal and connected in series with said bridge circuit, and a buffer circuit connected to the output terminal of the differential amplifier and connected in series with the differential amplifier, and wherein said buffer circuit comprises a first emitter-grounded amplifying circuit and a source follower.

9. A thermally sensing type flowing velocity measuring apparatus as defined in claim 8, wherein the source follower has a drain terminal side and said buffer circuit comprises a second emitter-grounded circuit at the drain terminal side of the source follower.

10. A thermally sensing type flowing velocity measuring apparatus as defined in claim 9, wherein said buffer circuit comprises a Darlington connection in which a transistor is connected to an input of said second emitter-grounded circuit.

11. A thermally sensing type flowing velocity measuring apparatus as defined in claim 8, wherein said source follower has a source terminal side and said buffer circuit comprises a third emitter-grounded circuit including a first transistor at the source terminal side of said source follower.

12. A thermally sensing type flowing velocity measuring apparatus as defined in claim 11, wherein said buffer circuit further connects a second transistor to an input of said third emitter-grounded circuit and thereby forms a Darlington connection.

13. A thermally sensing type flowing velocity measuring apparatus as defined in claim 8, wherein said source follower has a drain terminal side and said buffer circuit comprises a source-grounded circuit including a field affect transistor (FET) at the drain terminal side of said source follower.

14. A thermally sensing type flowing velocity measuring apparatus as defined in claim 8, wherein said source follower has a source terminal side and said buffer circuit comprises a source-grounded circuit including a field effect transistor (FET) at the source terminal side of said source follower.

15. A thermally sensing type flowing velocity measuring apparatus which comprises:

a substrate, a moat formed by etching said substrate, a thermally sensing type flowing velocity sensor comprising a bridge suspended over said moat, said bridge comprising an electrically insulative film formed on said substrate, a heater mounted on the bridge, a heater temperature measuring body mounted on the bridge, and a fluid temperature measuring body mounted on a part of said electrically insulative film, a flowing velocity measuring circuit for keeping a temperature difference between a temperature of said fluid temperature measuring body and a temperature of said heater temperature measuring body constant, wherein said flowing velocity measuring circuit comprises:

a bridge circuit comprising said fluid temperature measuring body, a first reference resistor connected in series with said fluid temperature measuring body, said heater temperature measuring body, a second reference resistor connected in series with said heater temperature measuring body, and a temperature setting resistor for setting said temperature difference between the temperature of said heater temperature measuring body and the temperature of said fluid temperature measuring body, a differential amplifier having an output terminal and being connected in series with said bridge circuit, and a buffer circuit connected to the output terminal of said differential amplifier and connected in series with the differential amplifier, and wherein said buffer circuit is constructed with a source-grounded amplifying circuit and a source follower.

16. A thermally sensing type flowing velocity measuring apparatus as defined in claim 15, wherein said source follower has a drain terminal side and said buffer circuit comprises an emitter-grounded circuit including a first transistor at the drain terminal side of the source follower.

17. A thermally sensing type flowing velocity measuring apparatus as defined in claim 16, wherein said buffer circuit comprises a Darlington connection in which a second transistor is connected to an input of said emitter-grounded circuit.

18. A thermally sensing type flowing velocity measuring apparatus as defined in claim 15, wherein said source follower has a source terminal side and, in said buffer circuit, an emitter-grounded circuit is provided at the source terminal side of said source follower.

19. A thermally sensing type flowing velocity measuring apparatus as defined in claim 18, wherein said buffer circuit further connects a transistor to an input of said emitter-grounded circuit and thereby the same forms a Darlington connection.

20. A thermally sensing type flowing velocity measuring apparatus as defined in claim 15, wherein said source follower has a drain terminal side and said buffer circuit is provided with a source-grounded circuit including a field effect transistor (FET) at the drain terminal side of said source follower.

21. A thermally sensing type flowing velocity measuring apparatus as defined in claim 15, wherein said source follower has a source terminal side and said buffer circuit is provided with a source-grounded circuit including a field effect transistor (FET) at the source terminal side of said source follower.

22. A thermally sensing type flowing velocity measuring apparatus which comprises:

a substrate, a moat formed by etching said substrate, a thermally sensing type flowing velocity sensor comprising a bridge suspended over said moat, said bridge comprising an electrically insulative film formed on said substrate, a heater mounted on the bridge, a heater temperature measuring body mounted on the bridge, and a fluid temperature measuring body mounted on a part of said electrically insulative film, and a flowing velocity measuring circuit driven by direct heating for keeping a temperature difference between a temperature of said fluid temperature measuring body and a temperature of said heater constant, wherein said flowing velocity measuring circuit comprises:

a bridge circuit comprising said fluid temperature measuring body, a first reference resistor connected in series with said fluid temperature measuring body, said heater, a second reference resistor connected in series with said heater, and a temperature setting resistor for setting said temperature difference between the temperature of said heater and the temperature of said fluid temperature measuring body, a differential amplifier having an output terminal and being connected in series with said bridge circuit, and a buffer circuit connected to the output terminal of the differential amplifier and connected in series with the differential amplifier, and wherein said buffer circuit comprises a source-grounded amplifying circuit and a source follower.

23. A thermally sensing type flowing velocity measuring apparatus as defined in claim 22, wherein said source follower has a drain terminal side and said buffer circuit comprises an emitter-grounded circuit at the drain terminal side of the source follower.

24. A thermally sensing type flowing velocity measuring apparatus as defined in claim 23, wherein said buffer circuit is constructed with a Darlington connection by further connecting a transistor to an input of said emitter-grounded circuit.

25. A thermally sensing type flowing velocity measuring apparatus as defined in claim 22, wherein said source follower has a source terminal side in said buffer circuit and an emitter-grounded circuit is provided at the source terminal side of said source follower.

26. A thermally sensing type flowing velocity measuring apparatus as defined in claim 25, wherein said buffer circuit further connects a transistor to an input of said emitter-grounded circuit and thereby the same constructs a Darlington connection.

27. A thermally sensing type flowing velocity measuring apparatus as defined in claim 22, wherein said source follower has a drain terminal side and said buffer circuit is provided with a source-grounded circuit including a field effect transistor (FET) at the drain terminal side of said source follower.

28. A thermally sensing type flowing velocity measuring apparatus as defined in claim 22, wherein said source follower has a source follower side and said buffer circuit is provided with a source-grounded circuit including a field effect transistor (FET) at the source terminal side of said source follower.

29. A thermally sensing type flowing velocity measuring apparatus which comprises:

a moat formed by etching said substrate, a thermally sensing type flowing velocity sensor comprising a bridge suspended over said moat, said bridge comprising an electrically insulative film formed on said substrate, a heater mounted on the bridge, a heater temperature measuring body mounted on the bridge, and a fluid temperature measuring body mounted on a part of said electrically insulative film, and a flowing velocity measuring circuit for supplying an electric power to said heater, wherein said flowing velocity measuring circuit further comprises:

monitor means for monitoring the temperature of the heater, a differential amplifier having an output terminal and being connected in series to said monitor means, and a buffer circuit connected to the output terminal of said differential amplifier for enlarging an amplitude of an output of said differential amplifier.

30. A thermally sensing type flowing velocity measuring apparatus as defined in claim 29, wherein said thermally sensing type flowing velocity measuring apparatus is an indirect heating flowing velocity measuring apparatus.

31. A thermally sensing type flowing velocity measuring apparatus as defined in claim 29, wherein said thermally sensing type flowing velocity measuring apparatus is a direct heating flowing velocity measuring apparatus.

* * * * *